US012084335B2

(12) United States Patent
Leon Camacho

(10) Patent No.: US 12,084,335 B2
(45) Date of Patent: Sep. 10, 2024

(54) WATER DISPENSING DEVICE

(71) Applicant: BEST PLANET SCIENCE LLC, Wilmington (DE)

(72) Inventor: Tatiana Svetlana Leon Camacho, Bogotá (CO)

(73) Assignee: Best Planet Science LLC, Wilmington, DE (US)

( * ) Notice: Subject to any disclaimer, the term of this patent is extended or adjusted under 35 U.S.C. 154(b) by 0 days.

(21) Appl. No.: 18/100,562

(22) Filed: Jan. 23, 2023

(65) Prior Publication Data
US 2024/0262672 A1    Aug. 8, 2024

(51) Int. Cl.
*B67D 1/00* (2006.01)
*C02F 1/32* (2023.01)
(Continued)

(52) U.S. Cl.
CPC .......... *B67D 1/008* (2013.01); *B67D 1/0003* (2013.01); *C02F 1/32* (2013.01); *C02F 1/441* (2013.01);
(Continued)

(58) Field of Classification Search
CPC .................. B67D 1/008; B67D 1/0003; B67D 2001/0092; B67D 2210/00005;
(Continued)

(56) References Cited

U.S. PATENT DOCUMENTS 3,968,568 A    7/1976  Jackson
4,969,991 A    11/1990 Valadez
(Continued)

FOREIGN PATENT DOCUMENTS

AU    2003218893 A1    10/2003
AU    2009297493 A1    4/2010
(Continued)

OTHER PUBLICATIONS

Kuo et al., "Short H-bonds and spontaneous self-dissociation in (H2O)20: Effects of H-bond topology," Journal of Chemical Physics, 118(8) (2003), pp. 3583-3588.
(Continued)

*Primary Examiner* — Terry K Cecil
(74) *Attorney, Agent, or Firm* — Bryan Cave Leighton Paisner LLP

(57) ABSTRACT

A water dispensing device, including: a water supply source; a structured water generator coupled to the water supply source to receive water and configured to output structured water, the structured water generator including: a vortex generator configured to rotate at a speed; a reactor coupled to the structured water generator and the water supply source, the reactor being configured to generate $H_2$ and to transfer the $H_2$ to the structured water generator; a gas supply coupled to the structured water generator, the gas supply being configured to provide one or more gases to the structured water generator; a magnetizer coupled to the structured water generator, the magnetizer being configured to generate a magnetic field to align the structured water in a direction; and a dispenser coupled to the magnetizer, the dispenser being configured to dispense the structured water.

20 Claims, 19 Drawing Sheets

(51) Int. Cl.
*C02F 1/44* (2023.01)
*C02F 1/68* (2023.01)

(52) U.S. Cl.
CPC ........ *C02F 1/68* (2013.01); *B67D 2001/0092* (2013.01); *B67D 2210/00005* (2013.01); *B67D 2210/00015* (2013.01); *B67D 2210/00123* (2013.01); *C02F 2201/002* (2013.01); *C02F 2307/10* (2013.01)

(58) Field of Classification Search
CPC ........... B67D 2210/00015; B67D 2210/00123; C02F 1/32; C02F 1/441; C02F 2201/002; C02F 2307/10; C02F 1/68; C02F 1/683
See application file for complete search history.

(56) References Cited

U.S. PATENT DOCUMENTS

| | | | |
|---|---|---|---|
| 5,494,538 | A | 2/1996 | Kirillov et al. |
| 6,797,165 | B2 | 9/2004 | Harrison |
| 7,090,878 | B2 | 8/2006 | Mehansho et al. |
| 7,799,363 | B2 | 9/2010 | Sherwood et al. |
| 7,897,192 | B2 | 3/2011 | Sherwood et al. |
| 8,383,688 | B2 | 2/2013 | Lo et al. |
| 9,351,517 | B2 | 5/2016 | Bromley |
| 10,849,339 | B2 | 12/2020 | Prakash et al. |
| 11,224,239 | B2 | 1/2022 | Murray |
| 2004/0096547 | A1 | 5/2004 | Ferruzzi |
| 2005/0121399 | A1 | 6/2005 | Hayashi et al. |
| 2005/0202146 | A1 | 9/2005 | Anantharaman et al. |
| 2007/0235379 | A1 | 10/2007 | Suddath |
| 2008/0226566 | A1 | 9/2008 | Poth et al. |
| 2016/0249668 | A1 | 9/2016 | Garashi |
| 2018/0029913 | A1 | 2/2018 | Ng |
| 2019/0225521 | A1 | 7/2019 | Heath |
| 2021/0214248 | A1 | 7/2021 | Echeverry Campos |

FOREIGN PATENT DOCUMENTS

| | | | | |
|---|---|---|---|---|
| AU | 2018202660 | A1 | 5/2018 | |
| CA | 2493066 | A1 | 1/2004 | |
| CA | 2850550 | A1 | 4/2013 | |
| CA | 2963964 | A | 10/2018 | |
| CN | 102551141 | A | 7/2012 | |
| CN | 105105256 | A | 12/2015 | |
| CN | 107265723 | A | 10/2017 | |
| CN | 107445386 | A | 12/2017 | |
| CN | 107651789 | A | 2/2018 | |
| CN | 108164077 | A | 6/2018 | |
| CN | 112321063 | A | 2/2021 | |
| CN | 112429894 | A | 3/2021 | |
| DE | 3630523 | A1 | 4/1987 | |
| DE | 3912498 | A1 | 4/1989 | |
| DE | 29805105 | U1 | 5/1998 | |
| EP | 669285 | A1 * | 8/1995 | .............. C02F 1/005 |
| EP | 2510801 | A1 | 10/2012 | |
| EP | 2814332 | A1 | 12/2014 | |
| ES | 2456704 | T3 | 4/2014 | |
| ES | 2609654 | T3 | 4/2017 | |
| ES | 2837457 | T3 | 6/2021 | |
| JP | 4653945 | B2 | 3/2011 | |
| KR | 102314002 | A | 6/2019 | |
| WO | 2009/115064 | A1 | 9/2009 | |
| WO | 2010005276 | A1 | 1/2010 | |
| WO | 2011139019 | A2 | 11/2011 | |
| WO | 2013044929 | A1 | 4/2013 | |
| WO | 2014/053865 | A1 | 4/2014 | |
| WO | 2017177823 | A1 | 10/2017 | |
| WO | WO-2019059481 | A1 * | 3/2019 | ................ C02F 1/48 |
| WO | 2022/1077113 | A2 | 5/2022 | |
| WO | 2022107113 | A3 | 5/2022 | |

OTHER PUBLICATIONS

G.H. Pollack, "The role of aqueous interfaces in the cell," Advances in Colloid and Interface Science, 103 (2003), pp. 173-196.

Hwang et al., "Exclusion zone and heterogeneous water structure at ambient temperature," PLoS ONE, 13(4) (3028), 27 pages.

Ozonek et al., "Effect of different design features of the reactor on hydrodynamic cavitation process," Archives of Materials Science and Engineering, 52(2) (2011), pp. 112-117.

Kajiya et al., "Hydrogen from intestinal bacteria is protective for Concanavalin A-induced hepatitis," Biochem. Biophys. Res. Commun., 386(2) (2009), pp. 316-321.

Shetty et al., (2020), "A comparative study of hydrogen generation by reaction of ball milled mixture of magnesium powder with two water-soluble salts (NaCl and KCl) in hot water" International Journal of Hydrogen Energy, vol. 45, Issue 48, pp. 25890-25899.

\* cited by examiner

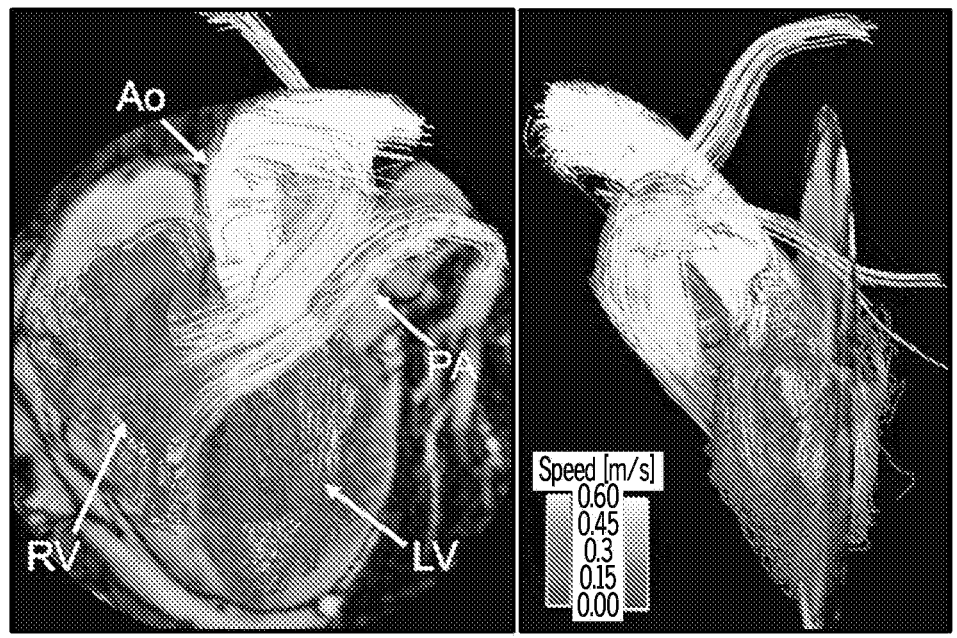
FIG. 1 < Prior Art >
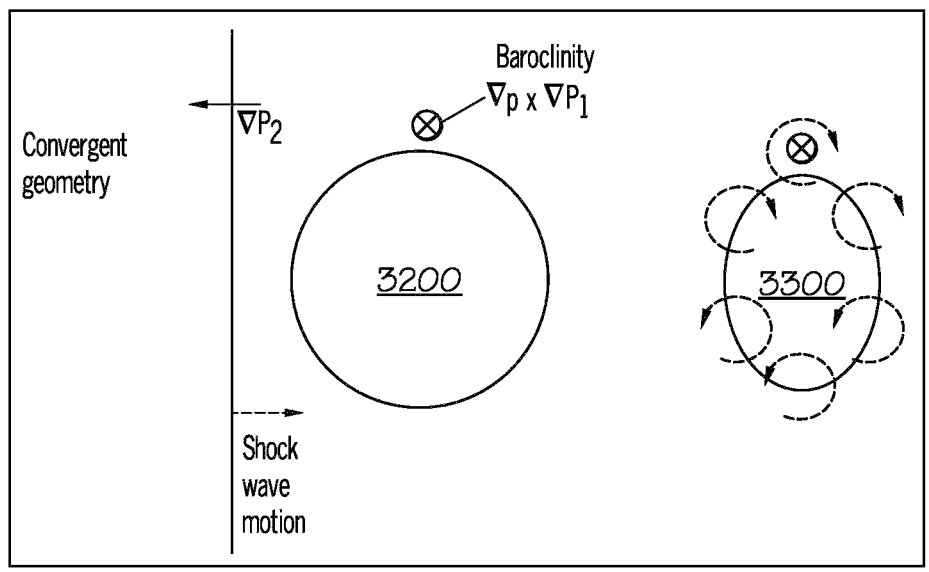
FIG. 2 < Prior Art >

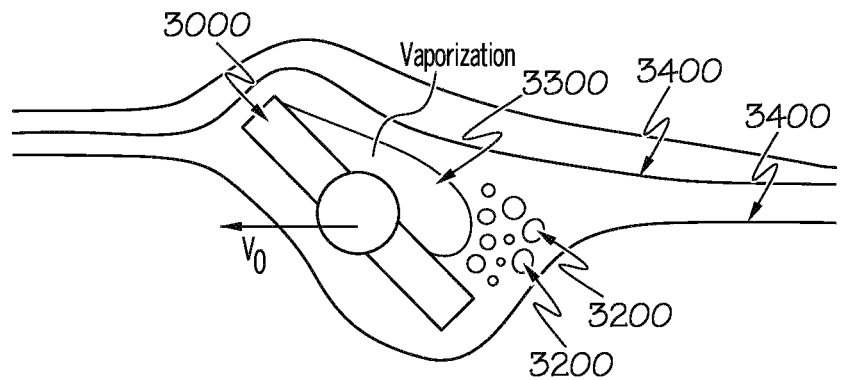
FIG. 3 < Prior Art >
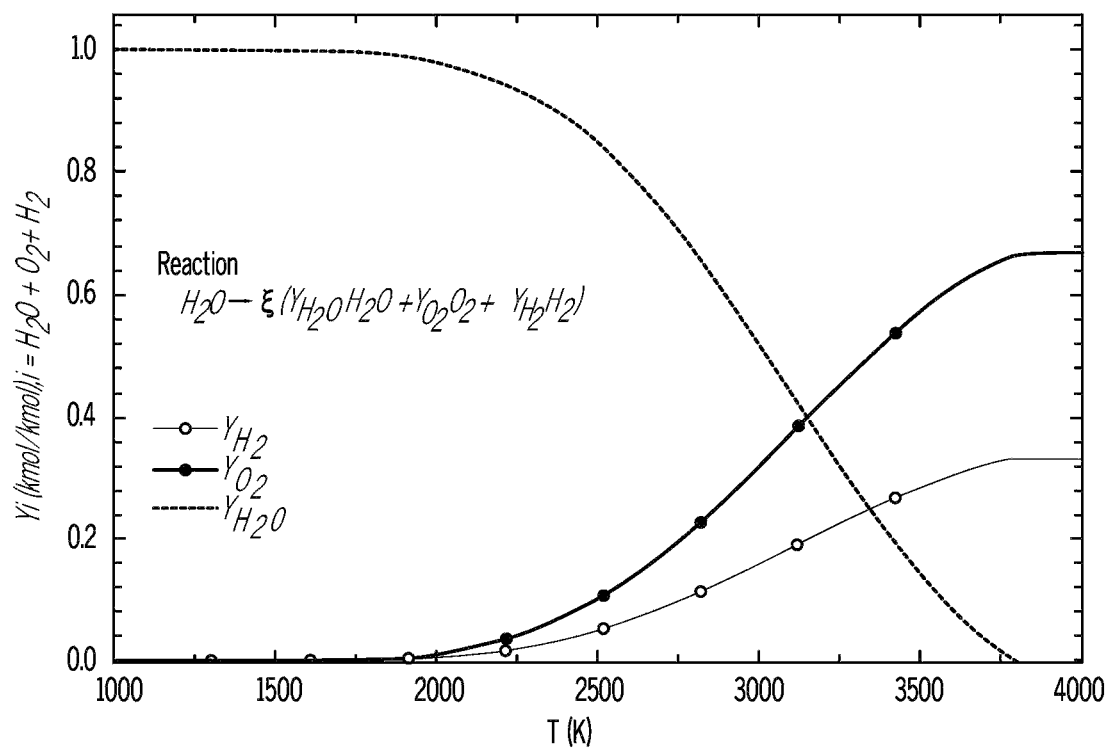
FIG. 4 < Prior Art >

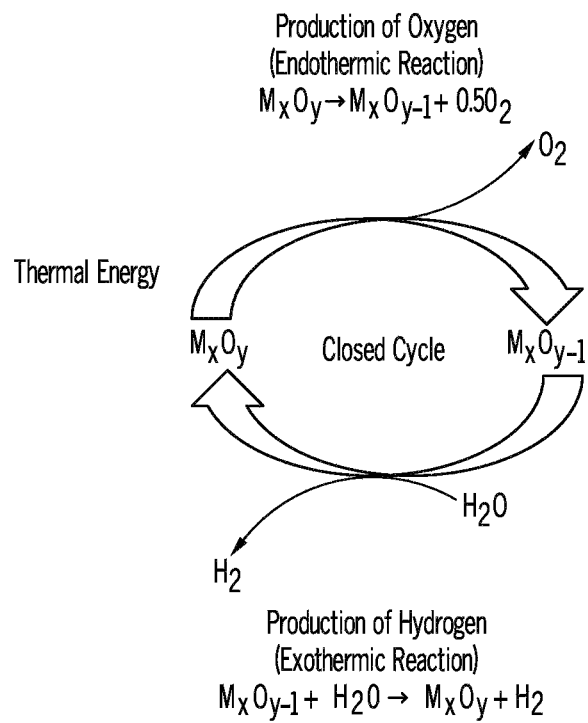
FIG. 5  < Prior Art >
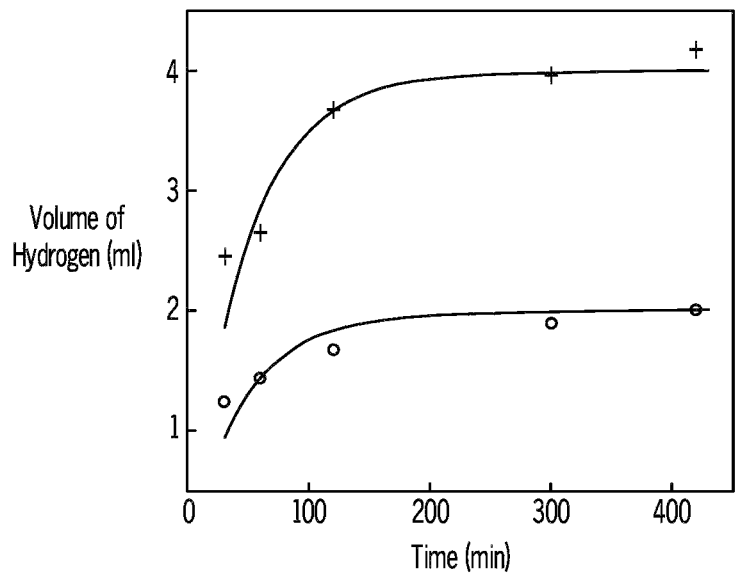
FIG. 6  < Prior Art >

WATER DISPENSING DEVICE

CROSS-REFERENCE TO RELATED APPLICATION

The present application is related to co-pending US application titled AQUEOUS FORMULATION INCLUDING DISSOLVED HYDROGEN GAS AND MINERALS AND ADDITIVES, which is filed concurrently herewith on Jan. 23, 2023 and has been assigned application Ser. No. 18/100,563, the contents of which are incorporated by reference in their entirety as if fully set forth herein, and which is referred to in this application as "the co-pending application".

TECHNICAL FIELD

The present disclosure relates to devices or systems for producing structured water, which includes and maintains a high concentration of dissolved hydrogen over time, where the devices or systems include several modular units, including a structured water generator that produces the structured water.

BACKGROUND

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions, or is known to be relevant to an attempt to solve any problem with which this specification is concerned.

Water helps to oxygenate blood, pumps our cells, and helps the cells to function at full capacity. Healthy cells are full of oxygen, which means that our muscles and organs are at full capacity, allowing our bodies to have superior immunity against external invaders, such as germs and viruses. The function of kidneys is possibly the best example of the benefits of water consumption. The more water we drink, the better our kidneys perform in removing any unwanted toxins through urination, and our immune system is not weakened by fighting said toxins. The movement of fluids in the body follows a vortex mechanism. For example, FIG. 1 shows the pattern of blood flow on the left and right sides of the heart. In FIG. 1, LV=left ventricle; RV=right ventricle; Ao=aorta; and PA=pulmonary artery. The blood flow pathways are emitted from the mitral and tricuspid valves during early and later diastole and traced to the final systole. As the blood flows from the atrium to the left and right ventricles, the flow of the blood is turbulent, and forms a vortex. The formation of a vortex flow in the heart is believed to be more efficient in filling the ventricle during a diastole.

Another way water improves the immune system is through the production of lymph. Lymph or lymphatic fluid runs through the human body with a very simple function: collecting bacteria from the body and carrying them to the lymph nodes, where said bacteria are destroyed. Lymphatic fluid can prevent extremely serious diseases, such as leukemia.

Water has very particular properties in the environment, and it can be found as three phases of matter—(1.) solid (in the form of ice), (2.) liquid (in the form of common water); and (3.) gas (in the form of steam or moisture). There are different processes for converting water from the gaseous to liquid phases, including mechanical extraction using a change in the surface temperature, and chemical processes, such as absorption, that traps water molecules.

Micronutrients in water also affects intracellular behavior in both an innate type immune system, which is involved in all levels of immune response, and the adaptive type immune response, which is activated by innate immunity when there is a serious infection. The most important micronutrients for the proper function of the immune system are vitamins A, C, D, E, B2, B6 and B12, folic acid, beta-carotene, copper, iron, selenium, zinc, potassium, manganese and silicon, but are not limited thereto.

Molecular hydrogen ($H_2$) is the lightest chemical element in the universe. This property lets hydrogen diffuse into every structure of the human body without any support. Thus, hydrogen can enter any cell just by diffusing through it, and without the need to be combined with any other elements or compounds or for additional carriers to aid in the diffusion process. That is why the most important actions of hydrogen's metabolic function are performed at the intracellular level.

Consumption of water with dissolved hydrogen stimulates natural anti-inflammatory phenomena that are necessary to complete the natural repairing cycle during the inflammation process Inflammation is a process that, in initial stages, serves to repair damaged structures and should be followed by a subsequent anti-inflammatory action to complete the repairing cycle. However, in some cases (such as in the case of most modern diseases), a permanent inflammatory stimulation remains as a pathophysiological phenomenon that prevents completion of the natural repairing cycle during the inflammation process. As a solution, consumption of hydrogen induces an anti-inflammatory effect by stimulating specific families of lymphocytes, regulating adhesion molecules, and stimulating the growth of cellular families.

Another benefit of consuming water with dissolved hydrogen is that it stimulates the formation of more than two hundred natural antioxidant systems in the human body that prevent cellular damage caused by oxidative stress of oxygen radicals that deteriorates cellular membranes and organelles and alters DNA. The ability of hydrogen to diffuse into cells without a carrier stimulates the aforementioned formation of antioxidants. Thus, hydrogen dissolved in water is able to act directly on the metabolic pathway of the formation of natural antioxidants, as well as indirectly by promoting metabolic pathways that prevent this alteration.

As an additional function, hydrogen participates in the regulation of cell growth and natural cell death, which makes it an important component of the process of regulating tumor growth and cancer pathology. Many of its functions are still new in the world of medicine and are pending exploration in diverse medical areas. Nevertheless, preliminarily studies have already generated good results in regenerative medicine, sports medicine, muscle performance and against metabolic diseases.

Molecular hydrogen ($H_2$) has been investigated in many areas due to the above-discussed properties. Two of these areas include: energy, i.e., using molecular hydrogen as an important vector for storage and distribution of energy; and the beneficial medicinal properties of molecular hydrogen for improving the quality of life. For this reason, hydrogen is considered a source of clean energy and a vector of health for humankind. Different experiments have been carried out by the scientific community, which show that water with dissolved molecular hydrogen provides many benefits for human beings at the cellular level, including improvements of many systems of the human body. However, a problem with hydrogen dissolved in water is that it is quickly lost to the atmosphere, which is the reason most water brands on the market have a low concentration of dissolved hydrogen in amounts of about 10 parts to 2,000 parts per billion, and such dissolved hydrogen is easily lost to the environment.

Molecular hydrogen has also been the subject of clinical studies that demonstrate the anti-apoptotic, anti-inflammatory, antioxidant and other protective effects of the water with hydrogen, as well as its important role in the immune system.

Inside the human body, hydrogen is produced naturally by intestinal flora by digestion of fibers. A study of the University of Florida and the Forsythe Institute in Boston, Massachusetts, confirmed the therapeutical effects of the hydrogen produced from bacteria. This study concluded that the reconstruction of the intestine's microbiota with hydrogen-producing $E.\ coli$ was protective against hepatitis induced by A. Concanvalin (M. Kajiya, K. Sato, M. J. Silva, K. Ouhara, P. M. Do, K. T. Shanmugam, T. Kawai Hydrogen from intestinal bacteria is protective for Concanavalin A-induced hepatitis Biochem. Biophys. Res. Commun., 386 (2) (2009), pp. 316-321.). It has also been shown that hydrogen produced by bacteria from acarbose administration is therapeutic. Perhaps this explains the significant reductions in cardiovascular events in patients that have taken the hydrogen-producing acarbose. (Tamasawa, A., Mochizuki, K., Hariya, N., Saito, M., Ishida, H., Doguchi, S., . . . Osonoi, T. (2015). Hydrogen gas production is associated with reduced interleukin-1β mRNA in peripheral blood after a single dose of acarbose in Japanese type 2 diabetic patients. European Journal of Pharmacology, 762, 96-101. doi: 10.1016/j.ejphar.2015.04.051.)

These studies not only suggest the therapeutic action of molecular hydrogen, but also demonstrate that it is safe for human consumption (i.e., it has a high safety profile). Hydrogen exposure is very natural to the human body because it is exposed to hydrogen daily as a result of normal bacterial metabolism.

In addition, hydrogen gas has also been used in deep-sea diving since the 1940s to prevent decompression sickness. Hundreds of studies in humans for deep-sea diving have shown that inhaling hydrogen gas in a greater order of magnitude than the normal therapeutic use is well tolerated by the human body without chronic toxic effects. Such studies on hydrogen related to bacterial production, deep-sea diving, and recent medical applications have not revealed any direct harmful side effects of hydrogen administration at biologically therapeutic levels.

Said safety profile of hydrogen can be considered paradoxical because the chemotherapeutic agents that induce biological effects should have both beneficial and harmful effects depending on the dose, timing, location, duration, etc. However, harmful effects have not been reported as yet for hydrogen. Perhaps, the harmful effects of ingesting molecular hydrogen are very transient and mild, and they are obscured by the beneficial effects or any potential harmful effects are mediated by the beneficial effects through a hormetic phenomenon.

Conventional water treatment methods include magnetization (WO 2013/044929), high-capacity, ecological purification (WO 2010/0005276), and filtration devices that remove microorganisms and organic contamination and/or sterilize the containers and water lines (U.S. Pat. Nos. 6,797,165 and 8,968,568). Conventional water dispensing methods and devices include vending or dispensing systems for providing purified water in response to a customer request (U.S. Pat. No. 4,969,991). Conventional purification mechanisms also include activated carbon filters, ion exchange resin beds, reverse osmosis (RO) filters, microbial sterilization, and the like. Conventionally, hydrogen-rich water generators include an electrolysis method of generating hydrogen in water (WO 2011/139019).

WO 2013/044929 describes a device for magnetizing and transmitting harmony to water contained in bottles when the water bottle has been installed, during which time the surface of the bottle is in contact with the device, said device comprising magnets, lights, landscape drawings, positive written messages and a mini sound system playing classical music. The water begins to be magnetized and harmonized and, as a result, the water supplied to the consumer is lighter and tastes better. WO 2013/044929 describes four different devices for treating water contained in bottles. Each of the water-treatment devices includes six magnets and a mini sound system, as well as lights, landscapes of different colors and a positive message that is incorporated into the disclosure.

WO 2010/0005276 describes a high-capacity, ecological purifying filter for non-potable, rain, or other water, made of very strong materials lasting for more than twenty years. It may be cleaned and regenerated completely and simply by the user with its accumulable system of compartments filled with sand, gravel or sand with gravel, activated carbon, which is optional but recommended, and where necessary, raw materials that remove additional contaminants in non-potable water. The financial cost of obtaining drinking water generated by this purifying filter is much lower than any other existing commercial filter. Its usefulness can be compared to that of a domestic appliance that is essential for daily life, but with the characteristic of being a product whose purification process is not contaminating, as it does not require any form of energy to work. The purpose of this disclosure is to help provide water-purifying filters that give users independent, low-cost access to drinking water, either in day-to-day life or following a natural disaster.

U.S. Pat. No. 8,968,568 describes a water or liquid substance filtration device which removes microorganisms and organic contamination and sterilizes the containers and water lines after the unit. The unit is portable or can be mounted stationary. The unit has a five-stage filtration and sterilization system controlled by an independent onboard computer system that can link to a central computer system to keep track of all independent units. The unit physically filters out of the water contaminants that can be reused, destroyed, or flushed down a safe drain. It can also be modified to filter for a certain size of particulate, making recovery of certain substances possible. The unit has a self-diagnostic system that can determine if the unit is operating properly and can shut down a part thereof if one of the capillary units fails.

U.S. Pat. No. 6,797,165 describes a modular water filter system having a plurality of filter canister receptacles, each receptacle having a diverter valve for routing water into and out of the particular canister installed in the receptacle. The diverter valves are interconnected by water hoses such that water is sequentially filtered by flowing into the first diverter valve, through its installed filter canister, then to the second diverter valve and through its installed filter canister, and through the succeeding diverter valves and filter canisters to a final tap. The filter configuration, including filter type, filter quality, and filter sequence, is changed by simply installing different filter canisters into the diverter valves. An intermediate tap can be connected to the output of any diverter valve to provide the user with water filtered by that diverter valve's filter canister.

U.S. Pat. No. 4,969,991 discloses a vending or dispensing system for providing purified water in response to a customer request. The water dispensing system has a water reservoir or tank containing first stage purified water and is provided with a subsystem for circulating water from the reservoir through a microbial sterilizer on at least a periodic basis for a predetermined period of time to maintain water quality within the tank. In one aspect, the water is passed through the microbial sterilizer before entering the tank for the first time as first stage water. Additional features described to insure water purity include flushing or rinsing the lines between a first stage water purification mechanism and the water reservoir prior to topping off the reservoir with purified water, and providing control mechanisms for ensuring that sump liquid cannot be suctioned back into the system. The purification mechanism, of which there may be more than one, may include, but is not limited to, an activated carbon filter, an ion exchange resin bed, a reverse osmosis (RO) filter and the like. The microbial sterilizer may include such equipment as one or more or multi-stage ultraviolet (UV) sterilizers. In one embodiment, the entire system is operated by a microcontroller in response to user commands.

WO 2011/139019 describes a hydrogen-rich water generator, in which an electrolysis cell including a positive electrode, a negative electrode, and a high polymer ion-exchange resin membrane is disposed at the lower portion of a removable drinking cup wherein said portable hydrogen-rich water generator includes: a cistern base including a float valve enabling a predetermined level of water to be supplied consistently from a water bottle; said drinking cup, which is installable at the cistern base; and a power supply for applying direct current electricity to the electrolysis cell. When the drinking cup containing clean water is installed at the cistern base and power is then supplied, the electrolysis cell electrolyzes the water in the cistern base to generate oxygen by means of the positive electrode on the cistern-base-side, and generate hydrogen by means of the negative electrode on the drinking-cup-side. The hydrogen is dissolved for a short period of time in the clean water in the drinking cup to generate hydrogen-rich water.

However, none of these references describe a process or system for creating an enriched water product that includes a high concentration of dissolved hydrogen in combination with minerals and additives that provide additional health benefits, where the enriched water can retain the dissolved hydrogen for a long time. Thus, there is an urgent need for a water-based beverage that provides the benefits of dissolved hydrogen in combination with desirable minerals and additives, and is able to maintain the concentration of these components for a long period of time.

SUMMARY

In light of the foregoing, an inventive aspect of this application is a system for dispensing structured water of this invention similar to water from natural sources (e.g. water springs and/or waterfalls) wherein the structured water is artificially created by implementing, for example, chemical, mechanical and magnetic means.

An inventive aspect of the present disclosure is a water dispensing device, comprising: a housing; a water supply source coupled to the housing; a water filtration system in the housing, the water filtration system receiving water from the water supply source to output filtered water; a structured water generator coupled to the water filtration system to receive the filtered water and configured to output structured water, the structured water generator comprising: a motor; a rotation generator coupled to the motor; and a vortex generator coupled to the rotation generator by a shaft, the vortex generator being configured to rotate at a first speed based on a rotational speed of the rotation generator, wherein the vortex generator comprises a spiral tube, and the vortex generator is configured to generate the structured water in accordance with the first speed; a mineral reactor coupled to the structured water generator and the water supply source, the mineral reactor being configured to generate MgO and $H_2$ and to transfer the MgO and $H_2$ to the structured water generator, wherein the mineral reactor includes: a container configured to store magnesium; and a rotator coupled to the container, wherein the rotator is configured to mix the magnesium with the filtered water received from the water filtration system to generate the MgO and $H_2$; a gas supply coupled to the structured water generator, the gas supply being configured to provide one or more gases to the structured water generator, wherein the one or more gases comprise at least one of oxygen, hydrogen, carbon dioxide, or nitrogen; a magnetizer coupled to the structured water generator, the magnetizer being configured to generate a magnetic field to align the structured water in a direction; and a dispenser coupled to the magnetizer, the dispenser being configured to dispense the structured water.

In another exemplary embodiment, the water dispensing device further comprises a mixer, wherein the mixer is a cyclone mixer configured to mix the MgO and $H_2$ with the filtered water at a second speed.

In another exemplary embodiment, the rotation generator comprises a first wheel and a second wheel, and wherein a diameter of the first wheel is greater than a diameter of the second wheel.

In another exemplary embodiment, the spiral tube container has a conical shape.

In another exemplary embodiment, the rotator includes a screw-type mixing rod configured to mix the MgO and $H_2$ with the filtered water.

In another exemplary embodiment, the first speed of the vortex generator is 1800 rpm to 7000 rpm.

In another exemplary embodiment, the water filtration system comprises a water filter, a reverse osmosis filter, and a disinfector.

In another exemplary embodiment, the reverse osmosis filter comprises at least one cation exchange membrane for removing salts.

In another exemplary embodiment, the disinfector comprises an ultraviolet light source.

In another exemplary embodiment, the water filter comprises at least one of a sediment filter, a granular activated carbon filter, or a compact activated carbon filter.

In another exemplary embodiment, the water supply source comprises a condenser and a collector for condensing and collecting atmospheric moisture.

In another exemplary embodiment, the condenser and the collector are arranged prior to the structured water generator.

In another exemplary embodiment, the condenser comprises a cooling system, and the cooling system comprises at least one of a radial fan, an axial fan or a thermoelectric cooler.

In another exemplary embodiment, the magnetizer comprises one or more neodymium magnets.

In another exemplary embodiment, the gas supply further comprises a hydrogen generator that produces hydrogen.

In another exemplary embodiment, the mineral reactor produces the $H_2$ via a chemical reaction between magnesium and the filtered water according to the following reaction:

$$Mg+H_2O \rightarrow MgO+H_2.$$

In another exemplary embodiment, the magnesium comprises granular magnesium having a particle size of 0.01 mm to 1 mm.

Another inventive aspect of the present disclosure is a water dispensing device, comprising: a water supply source; a structured water generator coupled to the water supply source to receive water and configured to output structured water, the structured water generator comprising: a vortex generator configured to rotate at a speed; a reactor coupled to the structured water generator and the water supply source, the reactor being configured to generate $H_2$ and to transfer the $H_2$ to the structured water generator; a gas supply coupled to the structured water generator, the gas supply being configured to provide one or more gases to the structured water generator; a magnetizer coupled to the structured water generator, the magnetizer being configured to generate a magnetic field to align the structured water in a direction; and a dispenser coupled to the magnetizer, the dispenser being configured to dispense the structured water.

Another inventive aspect of the present disclosure is a water dispensing device, comprising: a water supply source; a structured water generator coupled to the water supply source to receive water and configured to output structured water, the structured water generator comprising: a motor; a rotation generator coupled to the motor; and a vortex generator coupled to the rotation generator by a shaft, the vortex generator being configured to rotate at a first speed based on a rotational speed of the rotation generator, wherein the vortex generator comprises a spiral tube and the vortex generator is configured to generate the structured water in accordance with the first speed of the vortex generator; a mineral reactor coupled to the structured water generator and the water supply source, the mineral reactor being configured to generate MgO and $H_2$ and to transfer the MgO and $H_2$ to the structured water generator; a gas supply coupled to the structured water generator, the gas supply being configured to provide one or more gases to the structured water generator; a magnetizer coupled to the structured water generator, the magnetizer being configured to generate a magnetic field to align the structured water in a direction; and a dispenser coupled to the magnetizer, the dispenser being configured to dispense the structured water.

Another inventive aspect of the present disclosure is a method of producing structured water, the method comprising the steps of: receiving water from a water supply source; providing the water to a structured water generator, the structured water generator including a vortex generator; providing, by a reactor, hydrogen to the structured water generator; providing, by a gas supply, one or more gases to the structured water generator; rotating the vortex generator at a speed to induce cavitation and implosion in the vortex generator to generate a vortex for producing the structured water; outputting the structured water by the structured water generator; and generating, by a magnetizer, a magnetic field to align the structured water in a direction.

The water dispensing system has been developed to use water from a water supply network, or from any other source, and preferably integrates treatment of the water including, but not limited to: filtration and purification. Optionally, the device can have a carbonation unit to carbonate the water. Following such treatment, the water can be served to the consumer.

In other exemplary embodiments, the water dispensing device can include a cooling system to cool the water prior to adding the water to a structured water generator.

The present disclosure aims to provide water for human consumption that has enhanced properties, and can be advantageously used for preventing or treating diseases, and for improving the health of patients. Structured water dispensed from the water dispensing device of the present disclosure also provides energy for the proper functioning of internal cells, organs and body of a consumer.

BRIEF DESCRIPTION OF THE DRAWINGS

These and other features of this disclosure will now be described with reference to the drawings of certain embodiments, which are intended to illustrate and not to limit the disclosure.

FIG. 1 shows the vortex caused by blood flowing through a human heart.

FIGS. 2 and 3 are representative illustrations to explain the processes of cavitation and implosion.

FIG. 4 is a graphical representation of the dissociation of water as a function of temperature.

FIG. 5 is an illustration of a thermochemical processes for the generation of hydrogen gas from water.

FIG. 6 is a graphical representation of the results of a conventional method of creating a water with dissolved hydrogen.

DETAILED DESCRIPTION

Figure 7:
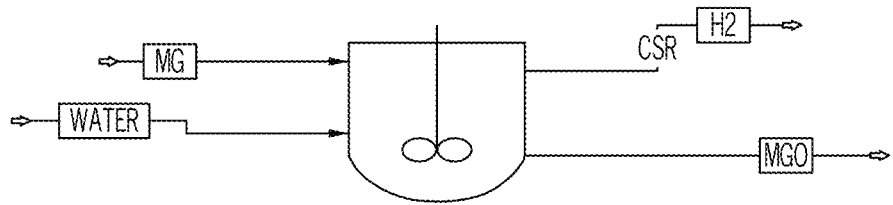
FIGS. 7-9 are schematic illustrations of the generation of $H_2$ from the reaction of Mg and $H_2O$.

Further aspects, features and advantages of this disclosure will become apparent from the detailed description which follows. It should be understood that the various individual aspects and features of the present disclosure described herein can be combined with any one or more individual aspect or feature, in any number, to form embodiments of the present disclosure that are specifically contemplated and encompassed by the present disclosure. Furthermore, any of the features recited in the claims can be combined with any of the other features recited in the claims, in any number or in any combination thereof. Such combinations are also expressly contemplated as being encompassed by the present disclosure.

As used herein, the singular forms "a", "an" and "the" are intended to include the plural forms as well, unless the context clearly indicates otherwise.

As used herein, "about" is a term of approximation and is intended to include minor variations in the literally stated amounts, as would be understood by those skilled in the art. Such variations include, for example, standard deviations associated with techniques commonly used to measure the amounts of the constituent elements or components of an alloy or composite material, or other properties and characteristics. All of the values characterized by the above-described modifier "about," are also intended to include the exact numerical values disclosed herein, as well as acceptable variance of such values. Moreover, all ranges include the upper and lower limits of the ranges.

To maximize the benefits of dissolved hydrogen and micronutrients, and cure the deficiency in conventional water-based beverages, the devices and systems of this application are directed to the production of structured water having characteristics consistent with inventive aspects of the present disclosure. To produce structured water of this invention, there is a need of a system that, in addition to purifying and structuring water, allows for the energetic and structural improvements thereof, and the addition of beneficial nutrients, such as hydrogen and minerals to the water.

Conventionally, "structured water" is defined as the total fraction of water that does not freeze below the transition point and exists between the semi-solid and solid states of water. "Structured water" has also been defined as the fraction of water that surrounds macromolecules such as proteins. These definitions are consistent with other researches wherein this type of water is called the "hydration layer" (Laage, Damien & Elsaesser, Thomas & Hynes, James. (2017). Perspective: Structure and ultrafast dynamics of biomolecular hydration shells. Structural Dynamics. 4. 044018. 10.1063/1.4981019).

When water is structured, it increases the capacity to retain dissolved hydrogen and change its diamagnetic properties compared to traditional water. The maximum retention capacity of traditional drinking water for dissolved hydrogen is about 2 ppm. In comparison, structured water can retain dissolved hydrogen in amounts of about 3 ppm to about 5 ppm. That is, structured water increases retention capacity of hydrogen by about 50% to about 150% compared with traditional drinking water. An example of structured water is the "plasma" used in the marine therapy at Quinton Laboratories. Such plasma is naturally generated in vortices of the sea and has been successfully used in treatments of certain conditions, such as Alzheimer's, immune dysfunction, diabetes, obesity, progression of atherosclerosis, hyperlipidemia and allergic rhinitis (Thomas Cowan, Cancer and the New Biology of Water, Chelsea Green Publishing, 2019, ISBN: 9781603588812).

A relationship between the physical characteristics of structured water and the evolution of cancer at the molecular level has also been established. Empirical studies have shown that mice with tumors have lower amount of structured water in their serum, liver, and heart (Pouliquen D, Olivier C, Debien E, Meflah K, Vallette F M, Menanteau J. Changes in liver mitochondrial plasticity induced by brain tumor. BMC Cancer. 2006 Oct. 3; 6:234. doi: 10.1186/1471-2407-6-234. PMID: 17018136; PMCID: PMC1599747). Studies have also shown that the growth of unstructured water (i.e., absence of hydration layers) initially causes cellular dysfunctions (e.g., benign tumors), and in the worst case, increases cell proliferation (i.e., neoplasia) (Jose de Felippe Jr., Paula vinas, Gustavo Vilela, Valter Hamachi, George Gennari, Integrative Medical Oncology: Pathophysiology and Treatment, Editora Sarvier, 8 Apr. 2019).

The structured arrangement of body fluids including water, blood, plasma, etc., are signs of a body in perfect condition and it confirms that human beings, not only require water with certain minerals, but also that said water should be structured in a certain way. Hydrogen has also been shown to benefit people with metabolic syndrome and athletes.

As used herein, the term "structured water" refers to a three-dimensional helical cage structure of polygonal water molecules having a hollow lumen, wherein the polygonal water molecules comprise two or more adjacent water molecules connected by hydrogen bridges. When viewed from the top, the arrangements of the water molecules of the helical cage structure has a hexagonal shape. The terms "structured water" and "$H_3O_2$ molecule" are used interchangeably through this application. As described earlier, the structure and growth of planar structures of water at different interfaces have been studied earlier. These previous studies are related to natural hydrogen bridge interactions in a particular zone of water, while the structured water of this invention is such that the arrangement of water molecules is altered by applying high energy processes to the water during the processes of cavitation and implosion in addition to the effects of magnetization and mineral injection processes, as described later in this application. These processes changes the energy of the bonds between adjacent water molecules, and a three-dimensional helical cage structure of polygonal water molecules having a hollow lumen, wherein the polygonal water molecules comprise two or more adjacent water molecules connected by hydrogen bridges with unique properties is achieved. The main differences between the "structured water" or $H_3O_2$ molecule found in the literature and that of this invention lies in the promotion of molecular self-replication, where the formation of the three-dimensional spiral cage structure of this invention, which is achieved under appropriate high energy processes, is promoted.

Moreover, the structured water of this invention is different from generally-known or described "structured water," because the "structured water" known until the discovery of this invention refers to an intrinsic process of water. In comparison, the structured water of this invention is created by the application of high energy processes ("structuration") as described herein. Structuration is a process in which, by means of implosion and cavitation energy, together with some organic and inorganic salts, at a temperature below atmospheric temperature, water is subjected to drastic changes of pressure and temperature in microstates so that this energy is able to enhance molecular interactions and change the properties of the water. As a result, the electrical and thermal conductivity of water can be changed to promote the formation of structured water of this invention. This change in the properties of water, together with the subsequent lowering of temperature, addition of molecular gases, and magnetization, promote the formation of the structured water of this invention. The structured water of this invention changes the properties of the water and the bioavailability of its constituent elements. As used herein below, unless otherwise indicated, the term structured water refers to the structured water of this invention having the inventive aspects of the present disclosure.

It is conventionally known that hydrogen is susceptible to separation from a water molecule under certain conditions of pressure and temperature using various methods including vortex generation, cavitation and implosion. There are several conventional reactions that can be used to produce hydrogen, including but not limited to: electrochemical, thermochemical, photochemical, radiochemical, biochemical and hybrid.

The application of a specific technology for hydrogen production depends on various factors, including but not limited to the nature of raw materials used, available energy source(s), including but not limited to polar, nuclear, hydroelectric, thermal, geothermal, wind, biomass, biofuel, fossil fuel, and the like, scale of production, and the like. When hydrogen is produced from water, and a high-temperature reservoir is available as a source of thermal energy, the following transformation technologies can be used: water electrolysis (which requires electricity), thermo-chemical cycles and hybrid thermochemical cycles.

A water molecule can dissociate into its constituent components—oxygen and hydrogen—under thermolysis conditions according to the following chemical reaction:

$$H_2O \leftrightarrow H_2 + \frac{1}{2}O_2.$$

Table 1 lists the dissociation percentage of water at different temperatures.

TABLE 1

| Temperature [° C.] | Dissociated quantity [%] |
| --- | --- |
| 1730 | 0.69 |
| 2030 | 2.64 |
| 2430 | 10.35 |
| 2730 | 22.40 |
| 3230 | 57.43 |

The standard thermodynamic functions for gaseous water (water vapor) are:
$\Delta H° = 241.93$ [kJ/mol]
$\Delta G° = 228.71$ [kJ/mol]
$\Delta S° = 44.33$ [kJ/mol], and
$\Delta C_p = 9.98$ [kJ/mol·K].

The functions shown above do not take into account the potentially catalytic action of substances commonly present in water, such as calcium and magnesium, among others.

In accordance with the above described functions, a vortex, which generates the phenomena of cavitation and implosion, provides the appropriate pressure and temperature conditions for hydrogen production from water. Vortex formation, and the related phenomena of cavitation and implosion, will be described herein. Dissolved hydrogen in the structured water dispensed from the water dispensing machine described herein has long term stability, as described in the co-pending application, and can function as an important physiological regulator for cells and organs, and also has antioxidant, anti-inflammatory, and anti-apoptotic effects, among various other advantageous effects.

The word cavitation is derived from cavity, and has its origins in Latin. Cavitation was first successfully studied by Reynolds in 1984 ("Effect of different design features of the reactor on hydrodynamic cavitation process", J. Ozonek, K. Lenik b, Archives of Materials Science and Engineering, Vol: 52, Iss: 2, 2011, pag: 112-117). Cavitation describes a phenomenon that occurs inside a liquid when a pressure field is subjected to changes in time and distance. These changes depend on the properties of the liquid which causes the formation of voids, filled with the fluid in its vapor phase, which are then violently compressed, reaching gaseous phases at high pressure and temperature. Due to this process, there is a rapid transfer of energy between a zone where there was previously a vacuum and where the water changes in density.

This phenomenon is caused by a difference in static pressure and vapor pressure of a fluid. When the static pressure of a fluid (pressure of a fluid at rest) is lower than its vapor pressure, small vapor-filled cavities can be present in the fluid. Increasing the pressure on the fluid results in implosion or collapse of these cavities, thereby generating waves of energy emanating from the site of the implosion(s).

A representative schematic of this process is shown in FIG. 2. In FIG. 2, one cavitation bubble 3200 is shown under normal pressure conditions (prior to exposure to a pressure gradient). When cavitation bubble 3200 is subject to baroclinity ($\nabla \rho \times \nabla p_1$) at a point $\otimes$ and converges with an area having a different pressure gradient ($\nabla p_2$), the cavitation bubble 3200 is subjected to a shock wave that moves through the fluid due to the difference in the pressure gradients. This causes the cavitation bubble 3200 to implode and form an imploded cavitation bubble 3300, which generates additional energy. Baroclinity, generally denoted by $\nabla \rho \times \nabla p$, where $\nabla \rho$ is a density gradient and $\nabla p$ is a pressure gradient of a fluid, is a measure of the misalignment between the density and pressure gradients of a fluid.

Another schematic representation of this process is shown in FIG. 3. As illustrated in FIG. 3, cavitation bubbles 3200 appear within the fluid when a vortex is generated in a fluid at a velocity $V_0$ by the action of a rotor (e.g., rotating blade) 3000. As these cavitation bubbles 3200 encounter the pressure differential created by the vortex along isobaric lines 3400, the cavitation bubbles implode into an elliptical-shaped imploded cavitation bubble 3300.

There are various methods for generating the above-described cavitation and implosion processes, including but not limited to: (1.) flowing over hydrofoils; (2.) supercavitating hydrofoils; (3.) flowing over propellers; (4.) turbulent cutting flow; (5.) using a water inlet cavity; and (6.) bubble chambers.

Exemplary embodiments of the water dispensing device of this application are illustrated in FIGS. 11 to 20, and will be described in further detail in this application. The water dispensing device includes a vortex generating system to achieve the above-described thermodynamic conditions through the processes of cavitation and implosion. The vortex generating system generates a plurality of microstates produce favorable environments for the generation of hydrogen.

The vortex of this invention generates an environment of microstates, which facilitate cavitation and implosion processes resulting in a localized pressure, calculated to be about 0.2 GPa to about 3 GPa and a localized temperature, calculated to be at least 5000 K in the water that facilitates the formation of structured water. As one example, the vortex of this invention can be created by rotating a vortex-generating system at 3600 rpm, which generates an average linear speed of about 50 m/s of the water in the vortex, and an absolute pressure that is less than 2 kPa. The vortex of this invention and the various components of the system of this invention that generates these local parameters will be described later in this application. As used herein below, unless otherwise indicated, the term vortex refers to the vortex of this invention having the inventive aspects of the present disclosure.

These aforementioned conditions generate pressure and temperature changes in the vortex that make viable the processes of initiation, collision, growth, cavitation cloud, loss of coherence, cavitation cloud growth, collision and implosion. These processes generate temperatures of around 10,000 (K). Consequently, thermolysis of water can occur in the microstates created in the water, and the diameter of these formations or micro-states could reach about 56 μm.

FIG. 4 is a graphical representation of the thermodynamic equilibrium of the products (hydrogen and oxygen) obtained from thermolysis of water. As shown in FIG. 4, the separation of water into $H_2$ and $O_2$ increases with increasing temperature, and reaches a maximum level of dissociation at temperatures greater than about 3750 K, at which point the molar fraction of $H_2O$ is approximately zero.

Other methodologies that use only thermal energy are thermochemical cycles that separate water into hydrogen and oxygen through a series of chemical reactions, for example, as shown in FIG. 5.

The application of redox reactions is a technique that is also used to increase the concentration of $H_2$ in drinking water (in form of solutes or colloids). Said increase of the hydrogen concentration is achieved conventionally by adding dietary supplements (e.g. effervescent tablets containing potassium bicarbonate, sodium bicarbonate, magnesium particles, tartaric acid, 1-leucine, organic sea salt, calcium lactate and inulin), which creates negative redox potentials in the water containing hydrogen nanobubbles that last for a few hours. For example, when a 230 mg tablet of a tablet that is purported to produce hydrogen is dissolved in 100 ml of distilled water, the volume of hydrogen generated increases with time, and stabilizes after about 150 min at a volume of about 2 ml to about 4 ml, as shown in FIG. 6. FIG. 6 shows the results of two different measurements of the hydrogen concentration in water using this process.

Other redox reactions can be used to generate hydrogen. One such example of a redox reaction is the reaction of hydrochloric acid with aluminum, as shown in Equation 2. Although the production of hydrogen is very simple through the use of components such as HCl and aluminum, this process can be harmful to health based on the use of HCl, and is thus, not a preferred method.

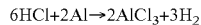

$$6HCl + 2Al \rightarrow 2AlCl_3 + 3H_2 \qquad \text{Equation 2}$$

The hydrogen dissolved in water may be present in its molecular form and, alternatively in the case of super saturated solutions, a solute or a colloid. In some cases, $H_2$ can be present in the form of nanobubbles in the water, with the nanobubbles having a diameter of up to about 600 nm and the formation of the nanobubbles can be achieved by electrolysis. Additionally, it has been found that the concentration of $H_2$ nanobubbles increases according to the nature of the ions present in the solution according to the following order $I^- > Br^- > Cl^-$ (anions), and $K^+ > Li^+ > Na^+$ (cations).

Referring back to FIG. 5, the separation of water into $H_2$ and $O_2$ can be a two-step reaction where a first metal oxide $M_xO_y$ is reduced to produce oxygen and then a second metal oxide $M_xO_{y-1}$ is reduced to produce hydrogen, where M can be any transition metal or combination thereof, and x and y are stoichiometric values of the constituent components. It should be noted that there is a wide variety of thermochemical cycles that can be implemented. For example, the CNRS-PROMES (Processes, Materials and Solar Energy) laboratory built a database with 280 thermodynamic cycles with operational temperatures of up to 2000° C. It should be also noted that each cycle uses specific cyclic reaction elements, and different types of catalysts can be used to optimize the reactions that produce $H_2$.

One example of hydrogen production is the reaction of magnesium with water. Recent research has shown that hydrogen can be produced efficiently (with an efficiency of 11% (see, e.g., Shetty et al., A comparative study of hydrogen generation by reaction of ball milled mixture of magnesium powder with two water-soluble salts (NaCl and KCl) in hot water, International Journal of Hydrogen Energy, vol. 45(48), pp. 25890-25899 (2020), ISSN 0360-3199, https://doi.org/10.1016/j.ijhydene.2020.03.156) to 90% (see, e.g., Kushch et al. Hydrogen-generating compositions based on magnesium. International Journal of Hydrogen Energy, vol. 36(1), pp. 1321-1325 (2011), doi:10.1016/j.ijhydene.2010.06.115) using powdered magnesium. Another example is the method described in U.S. Pat. No. 5,494,538 A where a magnesium alloy is mixed with minor amounts of one or more metals such as nickel and zinc, which acts as catalysts in the reaction of the magnesium alloy with chlorinated water.

To produce gaseous hydrogen, the amount of granular metallic magnesium used is enough to obtain the maximum solubility of hydrogen in water. The maximum solubility of hydrogen in water ranges from about 1 ppm to about 5 ppm of hydrogen dissolved in water.

Figure 8:
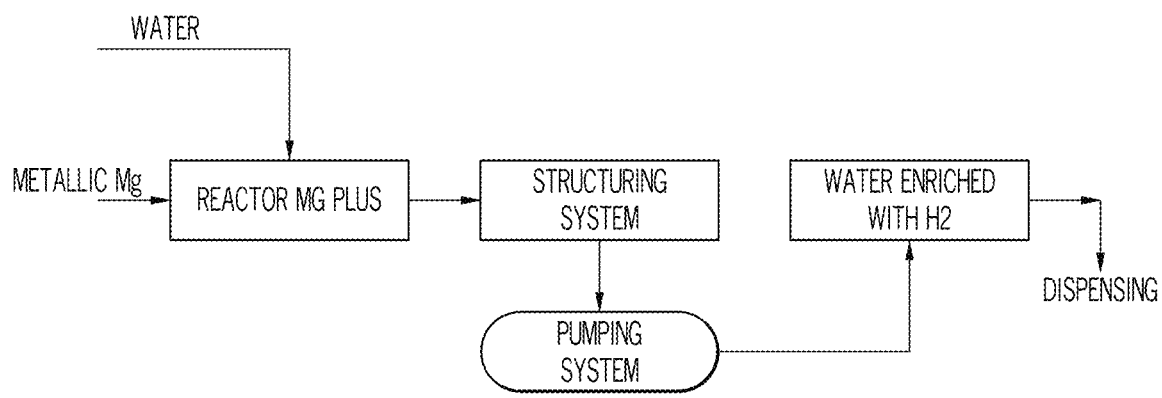

However, there have been no studies regarding the effect of magnesium on the cavitation, and subsequent implosion process, described herein. By the inclusion of Mg in the process described herein, the production of hydrogen is increased, while also improving the cavitation and implosion processes. FIG. 7 is a schematic that explains the process of mixing metallic Mg and water in any suitable vessel with stirring to produce MgO and $H_2$. As further illustrated in FIG. 8, the metallic Mg and water can be added to a reactor, and then sent to a structuring system. Water enriched with $H_2$ can then be pumped from the structured water generator to a water dispensing module. Each of these components, and the accompanying process, will be described in greater detail with reference to FIGS. 11 to 20.

Figure 9:
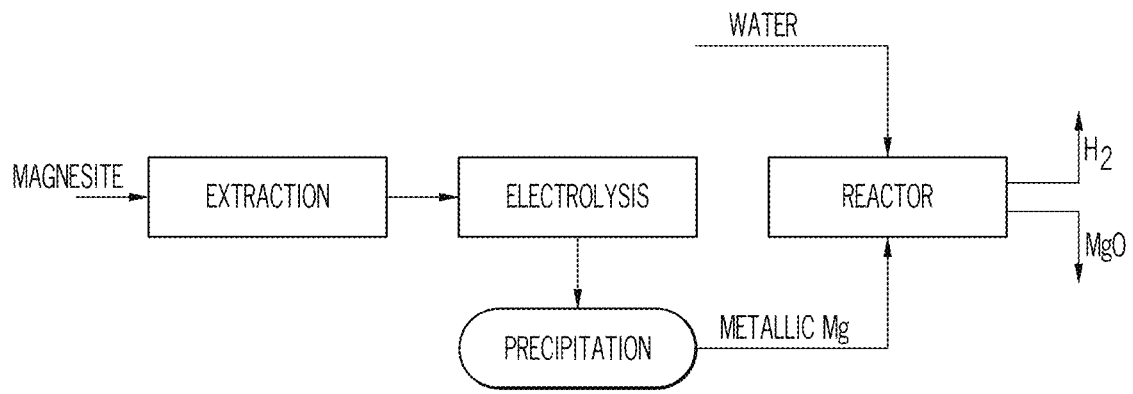

Mg is one example of a mineral that can be used to produce hydrogen in this manner, and also improving cavitation and implosion processes when the process is carried out at appropriate temperature, pressure, time parameters, and the like. As Mg is not found in nature in its pure state, it may be obtained from naturally-occurring compounds of magnesium, such as magnesite. Magnesite (generally $MgCO_3$) is a composition of magnesium salts and other trace elements, such as iron, nickel, manganese, cobalt, and the like. As generally illustrated in FIG. 9, metallic magnesium can be obtained from naturally-occurring magnesite using various processes, such as extraction, electrolysis and precipitation, performed in any suitable order, to produced metallic magnesium. The metallic Mg can then be used, as described above, to produce structured water enriched with dissolved hydrogen.

The materials for producing hydrogen are not limited to Mg and magnesite, and, any suitable material that reacts with water to produce hydrogen can also be used. Additional examples of such minerals include, but are not limited to alkali and alkaline earth metals such as Na, K, Ca, Sr, Ba, and the like, including any salts thereof.

As discussed above, an exemplary chemical process for producing hydrogen includes producing gaseous hydrogen from a reaction of magnesium and water according to the following reaction:

$$Mg + H_2O \rightarrow MgO + H_2$$

The ratio of the amount of magnesium used in the devices and systems of this application in a range of about 0.01 mg[Mg]/g[H$_2$O] to about 1 mg[Mg]/g[H$_2$O]. The amount of magnesium can be equal to any integer value or values within this range, including the end-points of these ranges and any acceptable variance.

The particle size of the Mg used can be about 0.01 mm to about 1 mm. The particle size of the Mg can be equal to any integer value or values within this range, including the end-points of these ranges and any acceptable variance. The particle size of the Mg affects the generation of hydrogen from the reaction of magnesium and water because the geometry of the cluster formed by metallic Mg is dependent on the size of the Mg particle. When the particle size of magnesium that reacts with water is within this range, smaller clusters of Mg are formed, which increase the surface area available for reaction with water and assists in the production of hydrogen bubbles. The effect of the Mg particle size on the volume of hydrogen production is further discussed with reference to Table 3.

Magnesium (Mg) is a very active element and reacts with water at low temperatures to produce magnesium oxide and hydrogen. The reaction can be shifted to producing magnesium hydroxide instead of magnesium oxide by increasing the amount of water. The reactions between magnesium and water are summarized in Equations 3-5:

$$Mg_s^0 + H_2'O \rightarrow Mg''O_{(aq)} + H_{2g}^0 \quad \text{Equation 3}$$

$$Mg_s + 2H_2O \leftrightarrow Mg(OH)_{2(aq)} + H_{2g} \quad \text{Equation 4}$$

$$Mg(OH)_2 \overset{\Delta}{\leftrightarrow} MgO_{(s)} + H_2O_{(g)} \quad \text{Equation 5.}$$

Hess's Law is used to determine whether a reaction is exothermic or endothermic based on the emission of reaction heat:

$$\Delta H_r = \Sigma \vartheta \ast \Delta H_p^0 - \Sigma \vartheta \ast \Delta H_r^0$$

where $\vartheta$ is the stoichiometric coefficient of products and reactants, $\Delta H_r$ is enthalpy of formation for a given reaction, $\Delta H_P^0$ is the standard state enthalpy of formation of the product(s), and $\Delta H_r^0$ is the standard state enthalpy of formation of the reactant(s).

For magnesium oxide and hydroxide, respectively, the $\Delta H_r$ values are calculated using Hess's Law:

$$Mg^{II}O_{(aq)}$$

$$\Delta H_r = \left(-602 \frac{KJ}{\text{mol}}\right) - \left(-285.5 \frac{KJ}{\text{mol}}\right) = -316.5 \frac{KJ}{\text{mol}}$$

$$Mg(OH)_{2(aq)}$$

$$\Delta H_r = \left(-925 \frac{KJ}{\text{mol}}\right) - \left(-285.5 \frac{KJ}{\text{mol}}\right) = -639.5 \frac{KJ}{\text{mol}}$$

As shown by the above values, the reactions that produce magnesium oxide or magnesium hydroxide are exothermic.

Within a chemical reaction, "limiting reagents" are those that are consumed first and limit the amount of product that can be obtained. For examples, in Equation 3 the limiting reagent is Mg with a value of 4.1 mol of Mg. In this reaction, 4.11 moles of water are required to react with 4.1 moles of Mg. Therefore, for consuming 5.5 mols of water, more Mg is required, i.e., the limiting reagent is magnesium and reagent in excess is water. By reacting magnesium and water, 166.45 g of MgO and 8.22 g of H$_2$ are produced.

When a reaction is carried out at a constant density, i.e., equal input, output and reaction density ($\rho_e = \rho_s = \rho$), and therefore, constant heat, i.e., equal input and output heat ($Q_e = Q_s$), the balance of matter can be expressed as a function of concentration of the various components because the flow rate of the input and output currents does not change. The balance of mass and energy as a function of concentration of the various components in the oxidation reaction of magnesium can be represented by the following relationships:

At a stationary state $$\frac{dN_i}{dt} = 0,$$

and $$F_i - F_i + (r_A)V = 0$$

$$F_{A_e} - F_{A_s} + (r_A)V = 0$$

$$(-r_A) = kC_{Mg}C_{H_2O} - kC_{MgO}C_{H_2}$$

$$F_{A_e} - F_{A_s} + (-kC_{Mg}C_{H_2O} + kC_{MgO}C_{H_2})V = 0$$

$$Q_e C_{A_e} - Q_s C_{A_s} + (-kC_{Mg}C_{H_2O} + kC_{MgO}C_{H_2})V = 0$$

$$QC_{A_e} - QC_{A_s} + (-kC_{Mg}C_{H_2O} + kC_{MgO}C_{H_2})V = 0.$$

Obtaining Q, and assuming that the residence time for an agitation tank reactor is $\tau = V/Q$, the expression for the mass balance is as follows:

$$(C_{A_e})_i - (C_{A_s})_i + (-kC_{Mg}C_{H_2O} + kC_{MgO}C_{H_2})\tau = 0$$

wherein $(C_{A_e})_i$, $(C_{A_s})_i$ are respectively the input and output concentration of the species i (i=Mg, H$_2$O, MgO and H$_2$). For an ideal mixture:

$$C_{A_s} = C_A, C_{B_s} = C_B, C_{C_s} = C_C.$$

Since the system is stoichiometric, the following equations are used to calculate the concentration in terms of the conversion of the system:

$$C_A = C_{A_o}(1-X)$$

$$C_B = C_{A_o}(\theta_B - X)$$

$$C_B = C_{A_o}(\theta_C + X)$$

$$C_B = C_{A_o}(\theta_D + X)$$

where $$\theta_B = \frac{C_{B_o}}{C_{A_o}} \theta_C = \frac{C_{C_o}}{C_{A_o}} \theta_D = \frac{C_{D_o}}{C_{A_o}}.$$

Therefore, the design expression for the reactor mass balance is:

$$(C_{A_0})_i - (C_A)_i + (-kC_{A_0}(1-X)C_{A_0}(\theta_B - X) + kC_{A_0}(\theta_C + X)$$
$$C_{A_0}(\theta_D + X))\tau = 0$$

On account of the reaction being exothermic, the heat profile is expressed by the following expression:

$$\sum_{i=Mg,H_2O,MgO,H_2} QC_{i_e}(H_{i_e} - H_i) + UA\Delta T +$$

$$(-\Delta H_A^o)(-kC_{A_o}(1-X)C_{A_o}(\theta_B - X) + kC_{A_o}(\theta_C + X)C_{A_o}(\theta_D + X))V = 0\P$$

$$(H_{i_e} - H_i) = \overline{C_{p_1}} * (T_e - T)\P$$

The thermodynamic model that is used to calculate the activity coefficients is selected because the magnesium is an electrolyte, and it becomes necessary to determine the electron localization function of MgO and $H_2$.

Parameters such as activation energies, temperatures, and pre-exponential factor can be determined by simulating the Arrhenius equation. The Arrhenius equation:

$$k = Ae^{\frac{-E_a}{RT}}$$

is used to calculate the activation energy and the pre-exponential factor at various temperatures for the ion-dipole interactions (Mg and $H_2O$) and for the species formed during the reaction, where k is the rate constant (frequency of collisions resulting in a reaction), T is the absolute temperature (in Kelvin), A is the pre-exponential factor, Ea is the activation energy for the reaction, and R is the universal gas constant.

Tables 2 and 3 show the relationship between the size of the magnesium particles and the volume of hydrogen that is produced.

TABLE 2

| metal parameter | water model | ΔG (kcal/mol) | $k_1$ (s$^{-1}$) $Mg^{2+}$ | $r_1$ (Å) | $r_2$ (Å) | $CN_1/CN_2$ |
|---|---|---|---|---|---|---|
| $MG^{CHARMM}$ | TIP3P | 12.7 ± 0.2 | 6.4 × 10$^3$ | 1.97 | 4.1 | 6/12 |
| $MG^{CHARMM}$ | SPC/E | 12.6 ± 0.5 | 7.5 × 10$^3$ | 2.00 | 4.1 | 6/12 |
| $MG^{CHARMM}$ | TIP5P | 13.1 ± 0.6 | 3.2 × 10$^3$ | 1.90 | 4.0 | 6/12 |
| $MG^{LB-Aqvist}$ | TIP3P | 13.2 ± 0.2 | 2.7 × 10$^3$ | 1.98 | 4.2 | 6/12 |

As shown in Table 3, for the same reaction time (3 minutes), more hydrogen is generated from the reaction of magnesium and water when the particle size of Mg is less than 2 mm, and the amount of hydrogen generated decreases with increasing Mg particle size.

TABLE 3

| Particle Size ($S_p$, mm) | $H_2$ Volume (mL) | Time (min) |
|---|---|---|
| $S_p < 2$ | 0.63 | 3 |
| $2 < S_p < 3$ | 0.5 | 3 |
| $3 < S_p$ | 0.3 | 3 |

Table 4 lists various components that can react with water to produce hydrogen. As can be seen from Table 4, despite the possibility of reaction, none or minimal (non-detectable) amounts of hydrogen are produced by reactants other than elemental Mg. Elemental magnesium is the only reactant that produces hydrogen in a measurable amount.

TABLE 4

| Solution Mg | | |
|---|---|---|
| Solubility of reactants in $H_2O$ (g/L) | | Concentration of $H_2$ produced (mg/L) |
| [Mg] | 0.006 | 2.67 |
| [MgO] | 0.006 | 0 |
| [MgOH2] | 0.012 | 0 |
| CuSO4 (Comparative Example) Condition 1 | 203 | 0 |
| [H2] | 0.0024 | g |
| [H2] | 0.0009 | g |
| [Mg] | 0.0005 | g |
| [MgO] | 0.0009 | g |
| [MgOH2] | 0.0013 | g |
| [CuSO4] * 5H2O Condition 2 | 7 | g |
| [Mg]total n | 0.0240 | g |
| H2 total p | 0.0010 | g |
| [MgO]t | 0.8292 | g |
| [MgOH2]t | 24.9884 | g |
| [CuSO4] | 8.5177 | g |

Designing a Vortex

A two-equation mathematical model that describes the phenomena observed in the water dispensing system of this invention is discussed below. A characteristic feature of the two-equation model is a fifth-order nonlinear aerodynamic damping term. Likewise, this model can be used for qualitative analysis, with additional experiments contemplated for quantitative analysis. Based on the two-equation mathematical model, the specific parameters and conditions that create the vortex were designed, as described herein.

The two-equation mathematical model includes Equations A and B:

$$\vec{\omega} = \nabla \times \vec{u} \quad \quad \text{Equation A}$$

$$\Gamma = \int_s \vec{\omega} \cdot \vec{n} \, dS \quad \quad \text{Equation B}$$

In Equation A, $\vec{\omega}$ represents a flow field with velocity distribution u, and $\vec{u}$ represents the velocity distribution of a field. In Equation B, Γ is defined as a circulation function of a fluid, and S is an arbitrary curved surface. The primary characteristics of the vortices present in a fluid are:

1. Vorticity at a point in a fluid is a vector. The component of vorticity in a particular direction ($\vec{n}$) is twice the angular velocity of either of two line segments in the fluid that are mutually orthogonal with $\vec{n}$. Vorticity is therefore a measure of how fast the fluid rotates.

2. Just because a flow field is rotating on a large scale, it does not mean that co in the flux is non-zero (in order to obtain a Γ different from 0, ω should be non-zero at least at one point or in a finite region for a viscous fluid).

3. Even if the current lines of a flow are not curved, the flow itself can be rotational, i.e., 'vortex lines are material lines'.

4. Vortex lines are lines that are tangential to the local vorticity vector. Vortex tubes are the set of all vortex lines that pass through a finite area.

5. The circulation around a vortex tube is constant, regardless of the shape and location of the contour.

6. As long as a fluid is barotropic, is subject to environmental forces, and only subject to potential corporeal forces, the circulation around any loop of material in the fluid is independent of time.

7. Vorticity is improved by stretching along the axes of rotation of the fluid element.

8. Viscosity causes vorticity to diffuse away from lateral lines.

9. Baroclinity can generate vorticity within a fluid.

10. When the flow is rotational, the vorticity of a fluid element is directly proportional to its density, and the compression of the fluid increases the vorticity.

Designing Cavitation and Implosion Processes in a Vortex.

A model for the onset of cavitation and implosion in a vortex is described here. In this model, a simplified Rayleigh-Plesset single-bubble implosion model is used. The degree of cavitation development is characterized by a non-dimensional parameter known as the cavitation number σ, which is defined by:

$$\sigma = \frac{p_{ref} - p_v}{\frac{1}{2}\rho V^2},$$

where $p_{ref}$ is the reference pressure of the liquid, $p_v$ is the actual pressure of the liquid, ρ is the fluid density, and V is the flow velocity.

The Rayleigh-Plesset equation is a second-order differential equation used to calculate the behavior of the bubble volume as a function of its radius R(t):

$$\rho\left[R\ddot{R} + \frac{3}{2}\dot{R}^2\right] = [p_v - p_\infty(t)] + p_{g0}\left(\frac{R_0}{R}\right)^{3k} - \frac{2S}{R} - 4\mu\frac{\dot{R}}{R},$$

where $[p_v - p_\infty(t)]$ is the difference between the applied pressure and the vapor pressure, and is the driving term of the bubble evolution. The second term of this equation is the contribution of the non-condensable gas, where the constant mass of the gas is assumed to follow a polytropic thermodynamic behavior characterized by a given polytropic coefficient k. S is the surface tension coefficient expressed in N/m or J/m².

Based on the above-described Rayleigh-Plesset model, the specific parameters and conditions that create the vortex, and resulting cavitation and implosion processes of this application were designed, as described herein.

The design of the implosion system described herein maximizes the implosion phenomenon, maximizes stiffness to prevent the system from reaching its elastic limits and makes it possible to reuse the system, imparts safety, minimizes manufacturing, maintenance and operating costs, and minimizes weight.

In an exemplary embodiment, to achieve the "structured water" of this application, the rotor of the motor is rotated at a rotational speed of about 1800 rpm to about 7000 rpm. The rotational speed can be equal to any integer value or values this range, including the end-points of these ranges, and any appropriate variances.

The initial pressure inside the structuring chamber during the cavitation and implosion process can be from about 50 kPa to about 105 kPa. The pressure can be equal to any integer value or values within this range, including the end-points of these ranges, and any appropriate variances. At a pressure within these ranges, the energy of the macrostates of water increases. During the implosion process, the localized pressure of the microstates of water existing in the vicinity of the implosion can reach about 0.2 GPa to about 3 GPa and the localized temperature can be at least 5000 K.

Within these ranges, the system described herein creates the cavitation and implosion processes at the required energy to produce the "structured water" having high hydrogen solubility over time. The structured water and its various components are discussed in the co-pending application, the contents of which are incorporated as if fully set forth herein.

The following is a description of the fluid dynamics that form the basis for creating the vortex of this invention to produce the structured water of this invention.

Speed distribution of a Rankine vortex with a central radius a and a maximum circulation Γ is:

$$v_\theta = \frac{\Gamma}{2\pi a^2} r \quad r \le a$$

$$v_\theta = \frac{\Gamma}{2\pi r} \quad r > a$$

The total angular momentum per unit length contained within a radius $r_0 \to \infty$ is:

$$\sum = \frac{1}{2}\rho\Gamma\left\{r_0^2 - \frac{1}{2}a^2\right\}$$

The cavitation vortex is designed such that:

r≤$r_i$(Steam)

r≥$r_i$(Liquid).

Figure 10:
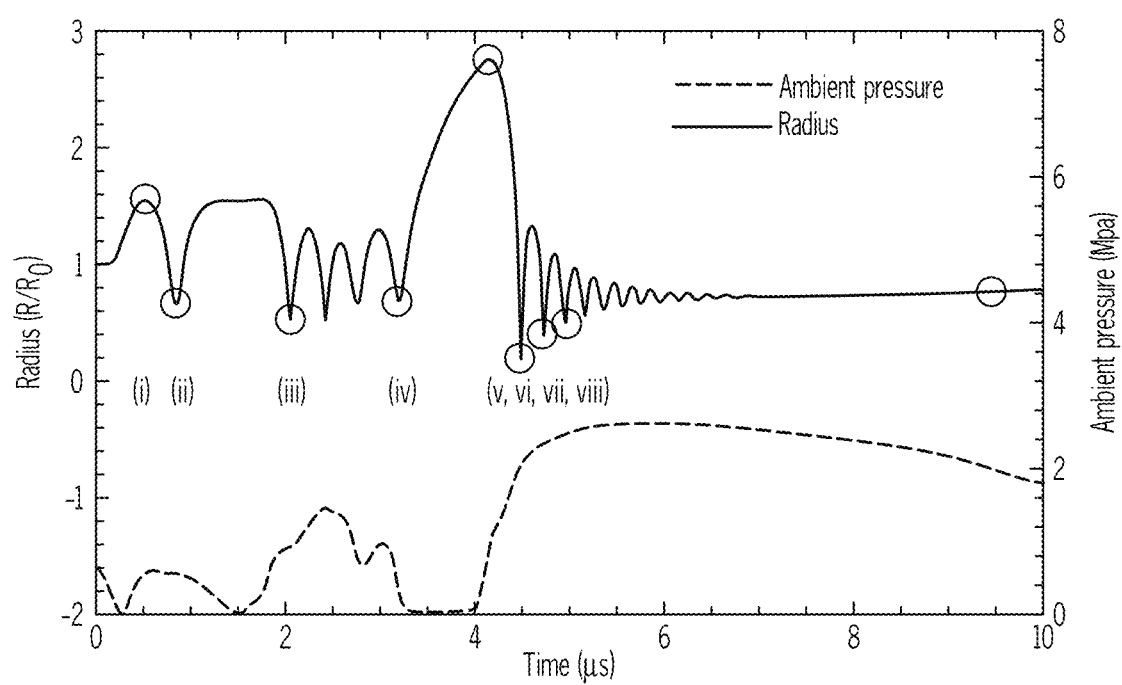
FIG. 10 is a representation of the vortex flow in a fluid as a function of the radius of the vortex.

A graphical representation of the calculated fluid dynamics of a cavitation vortex as a function of ambient pressure and radius of the cavitation vortex is shown in FIG. 10 (Khojasteh-Manesh et al., "Evaluation of Cavitation Erosion Intensity in a Microscale Nozzle Using Eulerian-Lagrangian Bubble Dynamic Simulation," J. Fluids Eng., 141(6): 061303 (14 pages), June 2019, pub. Online Apr. 4, 2019.)

Nomenclature of various parameters discussed in this application are shown in Table 5:

TABLE 5

| | |
|---|---|
| $t_o$ = Central or midline radius | $P_{crit}$ = Critical pressure |
| $A_R$ = Aspect ratio | $P_V$ = Vapour pressure |
| $A_S$ = Surface area | r = Radio |
| b = Hydrofoil semi-section | $R_0$ = Core radius |
| c = Rope length | S = Surface tension |
| $c_0$ = Maximum rope length | T = Tension Effort |
| $C_p$ = Pressure coefficient | u, v, w = Speed components |
| $C_D = \text{Drag coefficient} \frac{D}{1/2\rho U_0 A_S}$ | $U_0$ = Free flow rate |

TABLE 5-continued

| | |
|---|---|
| $C_{DF}$ = Viscous drag coefficient | $v_0$ = Peripheral component velocity. |
| $C_{11} = \dfrac{\text{Lifting}}{\text{coefficient}} \dfrac{L}{1/2\rho U_0 A_S}$ | x, y, z = Coordinates |
| $C_P$ = Pressure coefficient | $\alpha$ = Angle of attack |
| $C_{P_c}$ = Pressure coefficient in cavitation flow | $\alpha_0$ = Zero elevation angle |
| $C_{P_{min}}$ = Pressure coefficient based on static pressure | $\Gamma$ = Circulation |
| D = Drag force | $\lambda$ = Fictitious parameter |
| k = Unstable pressure factor | $v$ = Kinematic viscosity |
| L = Lifting force | $\rho$ = Density |
| n = Comitting vorticity in a particular direction | $\sigma$ = Cavitation index |
| p = Pressure | $\Sigma$ = Total angular momentum per unit length |
| P = Effective pressure | $\omega$ = Vorticity |

The above-discussed methods for achieving structured water having a high concentration of dissolved hydrogen in water that has long-term stability can be implemented via one or more water dispensing systems and methods described hereinafter with reference to FIGS. 11-20.

Figure 11:
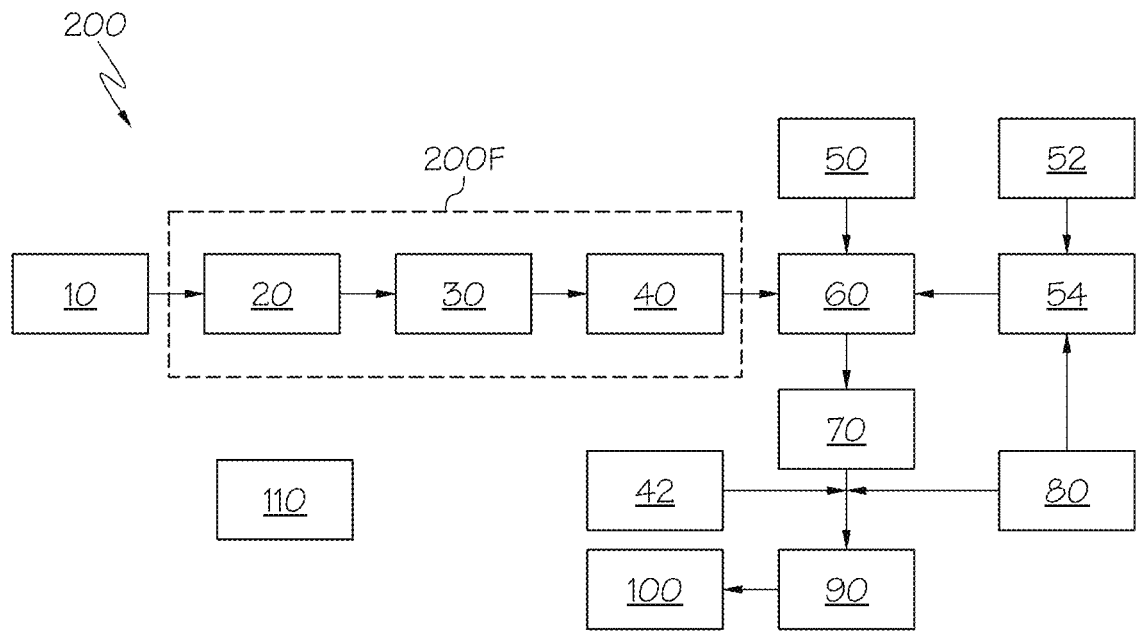
FIGS. 11-16 are illustrative embodiments of the water dispensing system of this invention.

An exemplary embodiment of the present disclosure is directed to a water dispensing system 200 schematically illustrated in FIG. 11. As shown in FIG. 11, the water dispensing system 200 may include a water supply source 10 and a water filtration system 200F. The water filtration system 200F may include a water filter 20, a reverse osmosis filter 30 and a disinfector 40. In one embodiment, the water supply source 10 may be from one or more sources. For example, separately or in combination, the water supply source 10 can be from one or more water supply networks and/or from the moisture in the air which could be condensed, collected, and used as water source. Nevertheless, the water supply source 10 can be any water supply source. One of the advantages of using atmospheric moisture as the water supply source 10 is that it allows the availability of water in absence of traditional sources such as rivers, water supply network, etc. In this kind of scenario, the condensation of atmospheric water becomes desirable, because only 0.025% of water in this world is drinkable. Therefore, in many areas around the world, where there is no access, or limited access, to traditional sources of water, this system is suitable, because the atmosphere has approximately 1.3× $10^{13}$ liters of water, and part of it can be condensed for human consumption.

After obtaining the water from the water supply source 10, the water may be output to the water filter 20. The water filter 20 may include, for example, a sediment filter and/or a filter with any other compound that can aid in the filtration of undesirable components from the water source. Additionally or alternatively, the water filter 20 may include activated carbon. In one embodiment, the reverse osmosis filter 30 may be optional depending on the type or quality of water. For example, the reverse osmosis filter 30 may be used in cases where tap water is used as the water source. In one embodiment, after filtration by the water filter 20, the water may be directed to the reverse osmosis filter 30 and then to the disinfector 40 including an emission of ultraviolet (UV) light. In some embodiments, the disinfector 40 may comprise an ultraviolet (UV) lamp, but is not limited thereto and any suitable disinfection method may be used. Various different types of water filtering devices and disinfecting devices may be used in the water filtration system 200F depending on the quality and type of water source. In some embodiments, the water filtration system 200F may not be used if the quality of water is sufficient for outputting the structured water in accordance with the present disclosure.

Still referring to FIG. 11, the water dispensing system 200 may further include a structured water generator 60 coupled, directly or indirectly, to the water filtration system 200F and a mineral supply 50. As discussed above, the water filtration system 200F may purify the water received from the water supply source 10 via the water filter 20, the reverse osmosis filter 30, and the disinfector 40. Then the water may be output to the structured water generator 60 to change the energy structure of the water by agitation and cavitation.

In one embodiment, the structured water generator 60 may receive minerals dispensed from the mineral supply 50 and the purified water discharged from the disinfector 40 or water directly from the water supply source 10. In one embodiment, the mineral supply 50 may add minerals and additives to the water in the structured water generator 60 via a mineral input. The minerals and additives can include, but are not limited to, calcium (Ca), magnesium (Mg), iron (Fe), zinc (Zn), copper (Cu), selenium (Se), one or more amino acids selected from biotin (vitamin B7), folic acid (vitamin B9), thiamine (vitamin B1), riboflavin (vitamin B2), pyridoxine (vitamin B6), cobalamine (vitamin B12), L-alanine, L-valine, L-isoleucine, L-citrulline, L-glutamine, theanine, and the like, and any suitable metabolite of essential amino acids, such as hydroxymethylbutyrate or β-hydroxy β-methylbutyrate, and the like. One or more of these minerals and additives can be in the form of a water soluble salt selected from lactate, sulfate, selenite, halide, nitrate, acetate, hydroxides, and the like, but are not limited thereto, and any suitable anion safe for consumption and/or ingestion can be used. In certain other embodiments, various suitable cations can be used in conjunction with any suitable anion that is safe for consumption and/or ingestion. In certain other embodiments, the mineral is a lactate or a selenite. In certain other embodiments, the mineral is one or more selected from calcium lactate, magnesium lactate, iron lactate, zinc lactate, copper lactate, sodium selenite, and the like. Suitable minerals that can be included in the water composition described herein are not limited, and any mineral or additive that is considered essential for the proper functioning of a human body and/or essential for life and/or considered essential trace elements and/or found in natural mineral water can be used provided the added minerals do not significantly affect the taste of the final beverage, and can include any mineral and/or additive described in the co-pending application.

In an exemplary embodiment, the water dispensing system 200 may comprise a feeder and a discharger (not shown in this figure for clarity of illustration and explanation). The feeder can be any suitable means for feeding a fluid to the water dispensing system 200, including but not limited to a pipe, a tube, a valve, a connecting part, and the like, and can be made of any suitable material. The discharger can be any suitable means for discharging a fluid from the water dispensing system 200, including but not limited to a pipe, a tube, a valve, a connecting part, and the like, and can be made of any suitable material. One or more of the feeder and the discharger can be formed integrally with the other components in the water dispensing system 200 or can be formed separately and connected to the water dispensing system 200 through one or more connecting means. Non-limiting examples of connecting means include flanges, adhesives, welding, and the like.

Still referring to FIG. 11, the water dispensing system 200 may further include an a mineral reactor or a mineral reactor 52 and a mixer 54. For example, the mixer 54 may be a cyclone mixer, but is not limited thereto. Further, the mixer 54 may receive the filtered water from the water filtration system 200F or receive water directly from the water supply source 10, depending on the quality of the water necessary to perform the structuration in accordance with the present disclosure. In one embodiment, the mineral reactor 52 may output $H_2$, MgO, and water to be input to the mixer 54. In one embodiment, the mixer 54 may receive, simultaneously or sequentially, one or more gases, including but not limited to hydrogen, oxygen, carbon dioxide, and the like, from a gas supply 80.

Figure 12:
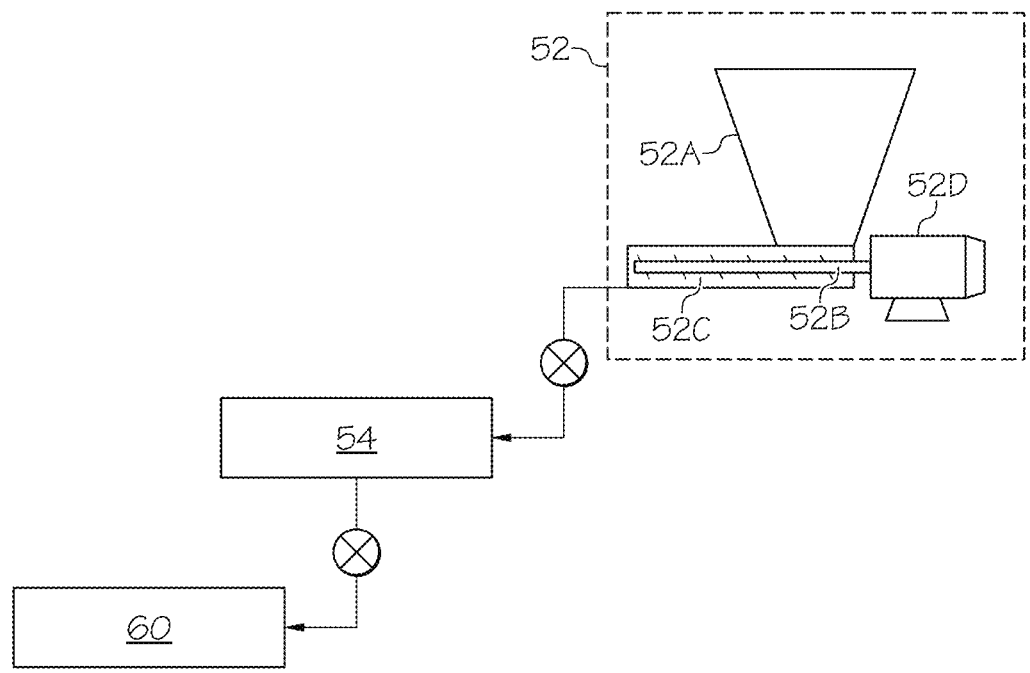

FIG. 12 shows one exemplary arrangement of the mineral reactor 52 and mixer 54 coupled to the structured water generator 60. In this embodiment, the mineral reactor 52 may include a container 52A, a motor 52D, a rotator (or rotary device) 52B, and a housing 52C. The rotator 52B may be a screw-type mixing device (or auger, drill, screw rod, etc.) attached to the motor 52D. Magnesium may be stored in the container 52A. The magnesium stored in the container 52A may be mixed with water by the rotator 52B, as shown in FIG. 12. The reactor (not shown in this figure for clarity of illustration and explanation) may then produce MgO and $H_2$, which may then be sent to the mixer 54 to be mixed with minerals, additives, and/or additional $H_2$, in accordance with the present disclosure.

The speed of the mixer 54 (e.g., cyclone mixer) may depend on the desired amount and quality of water being processed in the structured water generator 60. In one embodiment, an average speed of the water in the cyclone mixer may be set at 10 meters/second and the pressure may be 45 psi. However, the speed and the pressure may be varied, based on Bernoulli's principle, depending on the desired amount of MgO and $H_2$ output from the mineral reactor 52. Referring back to FIG. 11, the water from the mixer 54 may be output to the structured water generator 60 through a feeder described above. In one embodiment, the structured water generator 60 may include one or more blades that may be connected to a shaft that is connected to a speed amplifier. The speed amplifier may include a motor that rotates at high revolutions to generate a vortex in the water, which in turn produces cavitation and implosion, as described earlier in the present disclosure. This phenomenon allows water molecules to reach temperatures above about 5,000 degrees Kelvin (K), and depending on the energy generated during the implosion process, the temperature can be about 10,000 K or about 15,000 K, and the like, and, individually, any intervening temperatures. In one embodiment, the structured water generator 60 may comprise a rotating and translating housing structure that translates and rotates a helical-spiral-shaped housing to create the necessary cavitation and controlled implosion processes in the water contained in the helical-spiral-shaped housing. The movement of the rotating and translating housing structure is controlled by any suitable mechanism, including but not limited to actuators, such as a motor that transmits its movement through pulleys to the housing. The housing can be connected channels that direct the flow of the fluid, and lead it to perform rotational and translational movements with a frequency greater than about 300 Hz. These movements lead to a phase change of water into steam that generates the necessary cavitation and controlled implosion processes. The helical/spiral-shaped housing can be, but is not limited to, a tube in the form of a helix or spiral. Additional structural and mechanical details of the structured water generator 60 are later described in more detail.

The onset of cavitation is dependent on the coherent structure of directed flow, which is organized as paired vortex rings. In addition, cavitation/implosion is continuously found in the nucleus of the vortex, indicating a strong correlation between said cavitation/implosion and vortex dynamics. In the initial stage, the stretching of the vortex is the dominant factor, responsible for the growth of the vortex and the elliptical shape of the cavitation bubbles. Inside the water, the cavitation bubbles form an elliptical shape during the implosion process. The elliptical geometry of the imploding cavitation bubbles mirrors the elliptical flow of the fluid, and the cavitation and implosion process is aided by the elliptical geometry of the cavitation bubbles during the implosion process. In comparison, the dilation term could produce enhancement or suppression of local vorticity, depending on the volumetric variation induced by cavitation and, during the implosion stage, the bubble creates baroclinic vorticity and contributes to three-dimensional vorticity. The exposure to cavitation and/or implosion homogenizes the mixture of water, added minerals, additives and dissolved gases. Other processes that provide structuration or homogenize the mixture are ultrasonic mixing or exposure to a vacuum pressure difference, and can form a part of the devices and systems of this application.

Based on the periodic functioning of the implosion structure together with the temporal evolution of large eddies, vorticity can be separated into the following nine stages: initiation, collision, growth, cavitation cloud, loss of coherence, cavitation cloud growth, collision, implosion, and water restructuring.

The linear flow rate necessary to start the water restructuring process is in the range of about 30 m/s to 300 m/s. The linear flow rate can be any value or range within this range, including but not limited to the upper and lower limit and any acceptable variance.

Referring back to FIG. 11, the water dispensing system 200 may further include a magnetizer 70, a gas supply 80, a cooling system 90, and a dispensing module 100. As discussed above, in the structured water generator 60, minerals and/or additives may be added by the mineral supply 50, and MgO and $H_2$ may be added by the mineral reactor 52. Additionally or alternatively, the gas supply 80 may provide $H_2$ to the mixer 54. As described above, the mixer 54 (e.g., cyclone mixer) may mix, in addition to the $H_2$ from the gas supply 80, $H_2$ and MgO received from the mineral reactor 52, minerals and/or additives added from the mineral supply 50, and water received form the water filtration system 200F or the water supply source 10. The mixture from the mixer 54 may then be output to the structured water generator 60 to perform the structuration process in accordance with the present disclosure.

After the water leaves the structured water generator 60, the water may be then magnetized by the magnetizer 70 with, for example, neodymium magnets, then gases such as oxygen, hydrogen or carbon dioxide may be added, and the structured water may be cooled before being dispensed to a container for the final consumer.

In one embodiment, the magnetizer 70 may comprise any magnetization means that generates a magnetic field preferably strong enough to configure the magnetic field of the water in a desired orientation. Any suitable magnetization means can be used, including but not limited to magnets of metals, such as iron (Fe), cobalt (Co), nickel (Ni), rare earth metals, combinations and alloys thereof; naturally magnetic minerals that are called "calamites" that are composed mostly of iron; and/or electromagnets. In some embodiments, the magnetizer 70 may comprise neodymium magnets. The arrangement of magnets in the magnetizer is not limited, and any suitable arrangement can be used. In some exemplary embodiments, the magnetizer 70 aligns the water molecules by generating an electromagnetic field in a conductive material that produces magnetization by induction. In one embodiment, the cooling system 90 may be arranged to be part of a condenser and/or to maintain a suitable temperature for the structuration of water and/or to cool the final product before being discharged from the water dispensing system 200. Further, the cooling system 90 may comprise any suitable means for cooling a fluid, including but not limited an air-cooled system, a water-cooled system, a thermoelectric cooler, an electric cooler, and the like.

Still referring to FIG. 11, in addition to providing $H_2$ to the mixer 54, the gas supply 80 may provide one or more gases such as oxygen, hydrogen, carbon dioxide, nitrogen, or a combination thereof to the water discharged from the magnetizer 70. For example, $CO_2$ may be provided to produce carbonated drinks (e.g., sparkling water), and oxygen may be added to provide more stable and longer lasting structured water. The gasified water may then be cooled by flowing through the cooling system 90 and dispensed through the dispensing module 100 and into a container (not shown in this figure for clarify of illustration). In one embodiment, the water dispensing system 200 may optionally include an additional disinfector 42. The additional disinfector 42 may be similar to the disinfector 40 described above. The disinfector 42 may disinfect or sterilize the water output from the magnetizer 70 before being input to the cooling system 90. All the elements may be controlled and energized by a power supply system (not shown in this figure for clarity of illustration) and a controller 110. Each of components shown in FIG. 11 can be arranged in any order to facilitate the proper functioning of the water dispensing device, including being arranged sequentially as shown in FIG. 11.

Figure 13:
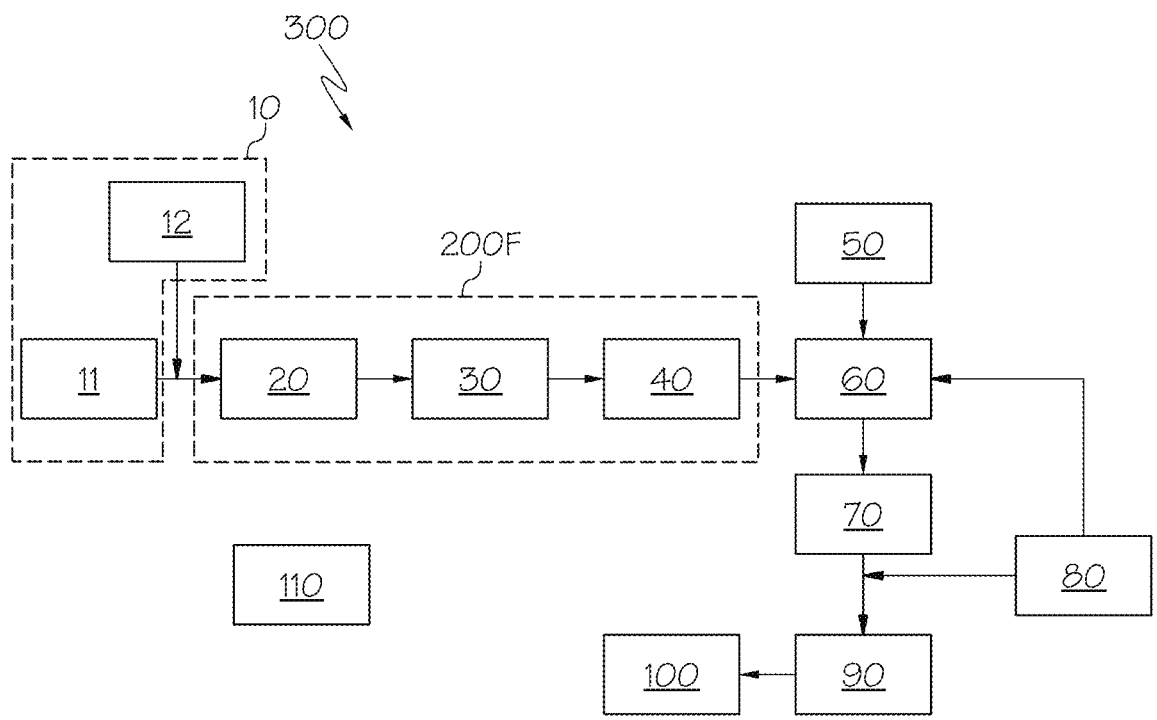

FIG. 13 illustrates an exemplary embodiment of a water dispensing system 300, according to one or more aspects of the present disclosure. The water dispensing system 300 may include the same or similar components as describe in the water dispensing system 200 shown in FIGS. 11 and 12. The descriptions of the same components shown in FIGS. 11 and 12 are omitted with respect to FIG. 13 for brevity and clarity of explanation. Still referring to FIG. 13, the water dispensing system 300 may include the water supply source 10 that may include, additionally or alternatively, a direct supply 11 from a water supply network and/or a condensing-collector 12, in which atmospheric moisture is condensed, collected and stored. In some embodiments, the water dispensing system 300 may use only one of the direct supply 11 or the condensing-collector 12. In other embodiments, the water dispensing system 300 may use both direct supply 11 and the condensing-collector 12 simultaneously, sequentially, or alternatively together, depending on the availability of water and/or desired amount of water to be processed by the structured water generator 60. The water dispensing system 300 including the water supply source 10 shown in FIG. 13 may operate in the similar manner as described in reference to the water dispensing system 200 in FIG. 11.

Figure 14:
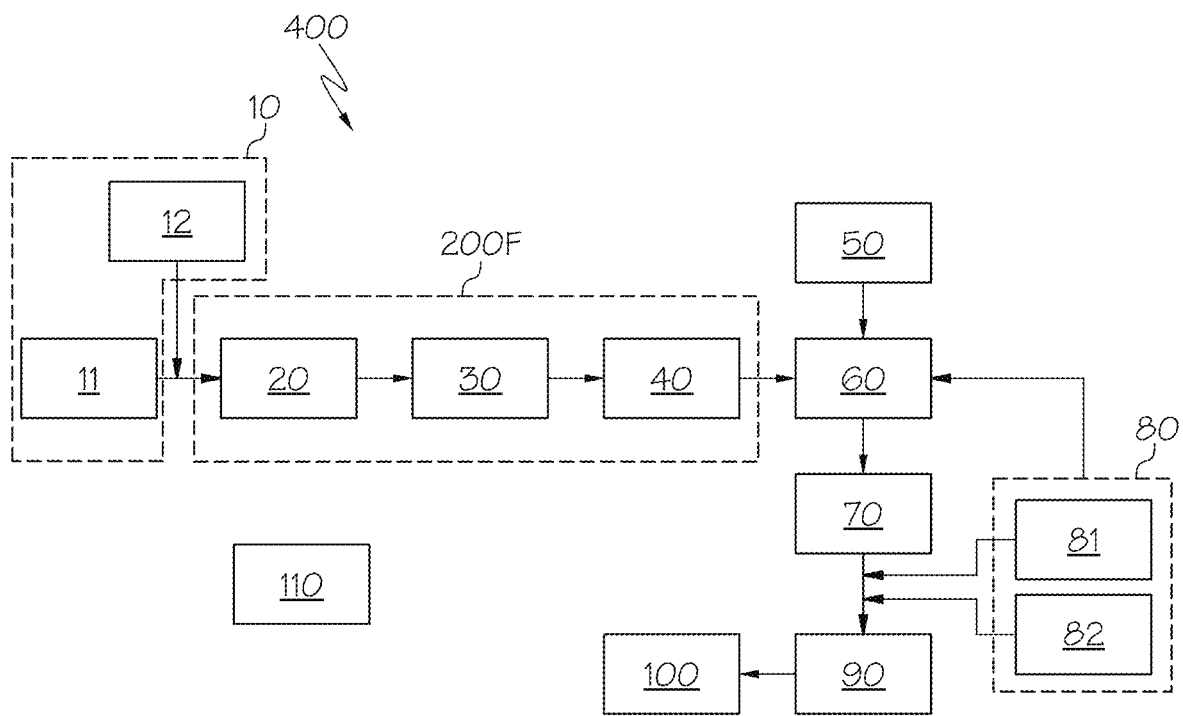

FIG. 14 illustrates one exemplary embodiment of a water dispensing system 400, according to one or more aspects of the present disclosure. The water dispensing system 400 may include the same or similar components as describe in the water dispensing systems 200 and 300 shown in FIGS. 11-13. The description of the same components shown in FIGS. 11-13 are omitted with respect to FIG. 14 for brevity and clarity of explanation. Still referring to FIG. 14, the water dispensing system 400 may include the gas supply 80 that may include, additionally or alternatively, a first gas supply module 81 and a second gas supply module 82 that may generate or store gases, including but not limited to, oxygen, hydrogen, carbon dioxide and/or nitrogen. The gas supply 80 may include means, structures or devices for producing (e.g., hydrogen generation cells, Proton Exchange Membrane (PEM) Cells) or separating gases, such as electrolysis or other processes, and means for gas storage, such as cylinders or pressurized tanks. As described above, for example, $CO_2$ may be provided to produce carbonated drinks (e.g., sparkling water), and oxygen may be added to the water to provide more stable and longer lasting structured water. The water dispensing system 400 including the gas supply 80 shown in FIG. 14 may operate in the similar manner as described in reference to the water dispensing systems 200 and 300 in FIGS. 11 and 12.

Figure 15:
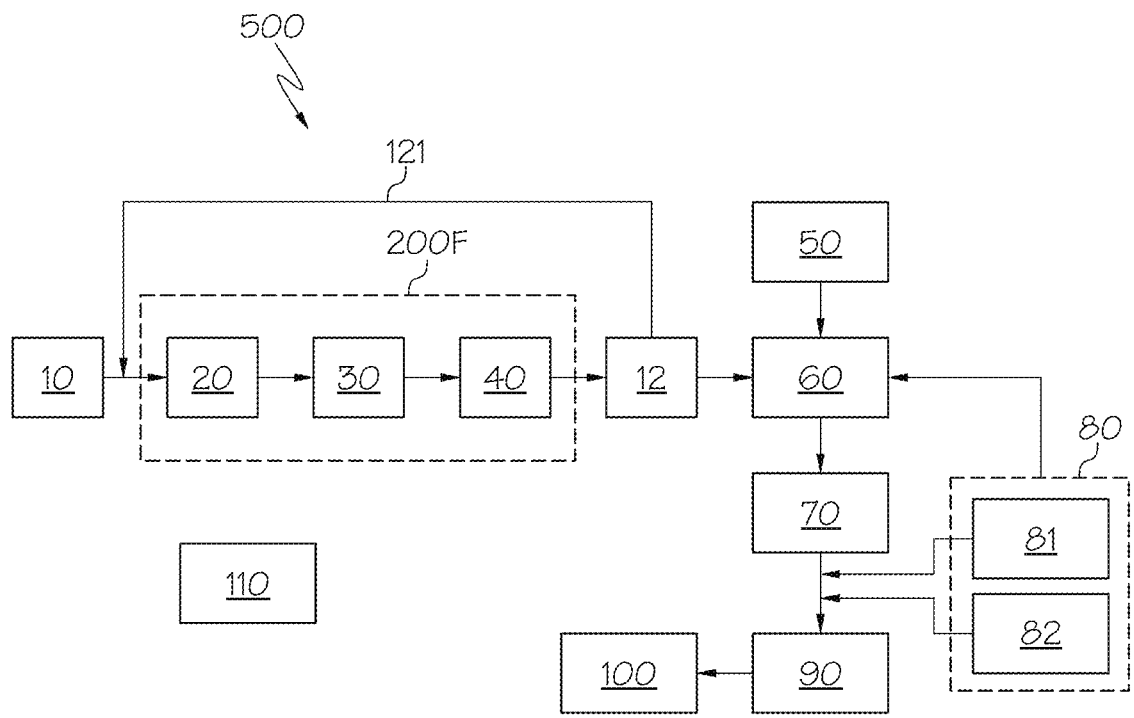

FIG. 15 illustrates one exemplary embodiment of a water dispensing system 500, according to one or more aspects of the present disclosure. The water dispensing system 500 may include the same or similar components as describe in the water dispensing systems 200-400 shown in FIGS. 11-14. The description of the same components shown in FIGS. 11-14 are omitted with respect to FIG. 15 for brevity and clarity of explanation. The water dispensing system 500 may include a condensing-collector 12 coupled, directly or indirectly, between the water filtration system 200F and the structured water generator 60. The condensing-collector 12, which condenses and collects atmospheric moisture, functions as a cooling system that sends condensed water from the air to the input of the water filter 20 through plumbing 121. In one embodiment, the condensing-collector 12 may provide water to the structured water generator 60 without being filtered by the water filtration system F. For example, in a desert location where the water in the atmosphere is likely to be clean without or with very little impurities or pollutants, the water condensed from the condensing-collector 12 may be sent directly to the structured water generator 60. The water dispensing system 500 including the additional condensing-collector 12 and plumbing 121 may operate in the similar manner as described in reference to the water dispensing systems 200-400 in FIGS. 11-14.

Figure 16:
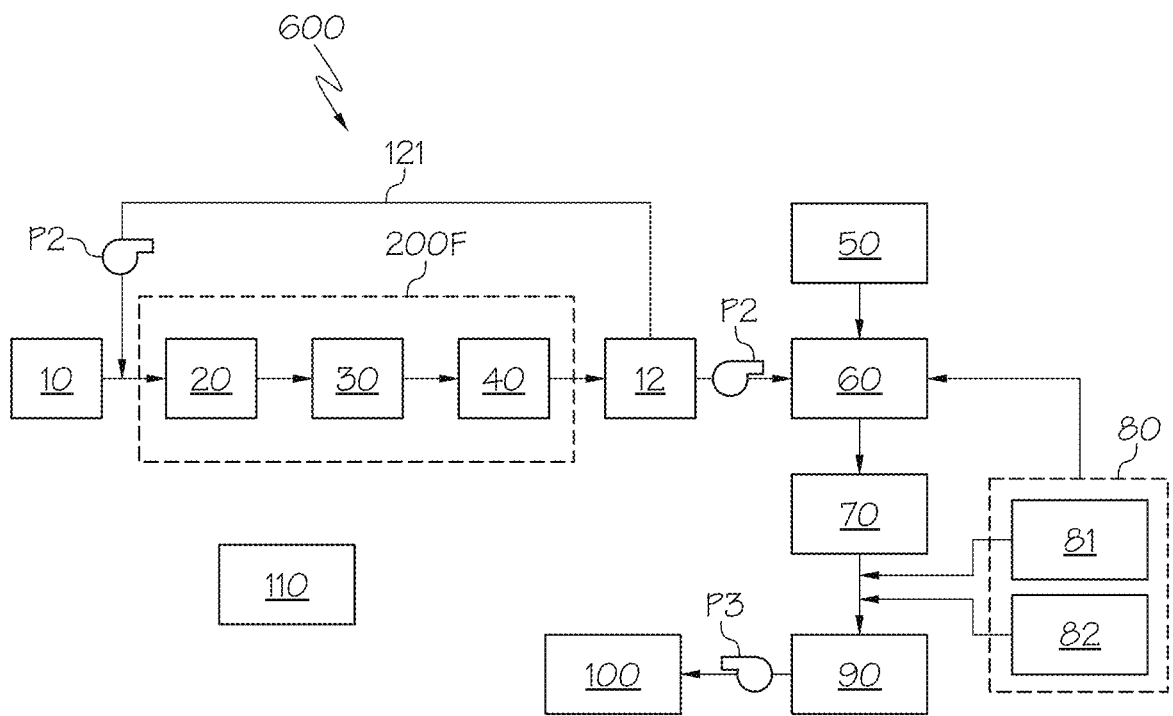

FIG. 16 is a schematic illustration of one exemplary arrangement of the components of a water dispensing system 600. The water dispensing system 600 may include the same or similar components as describe in the water dispensing systems 200-500 shown in FIGS. 11-15, in accordance with one or more aspects of the present disclosure. The description of the same components shown in FIGS. 11-15 are omitted with respect to FIG. 16 for brevity and clarity of explanation. FIG. 16 shows the locations in the connection pipes where injection pumps P1, P2, and P3 can be located to drive the water under treatment to be discharged. The pumps P1, P2, and P3 may provide suitable pressures to communicate fluid (e.g., water) to and from various components of the water dispensing system 600. The arrangements of the injection pumps are not limited thereto, and any suitable arrangement can be used in accordance with embodiments of the present disclosure. The water dispensing system 600 shown in FIG. 16 may operate in the similar manner as described in reference to the water dispensing systems 200-500 in FIGS. 11-15.

Figure 17A:
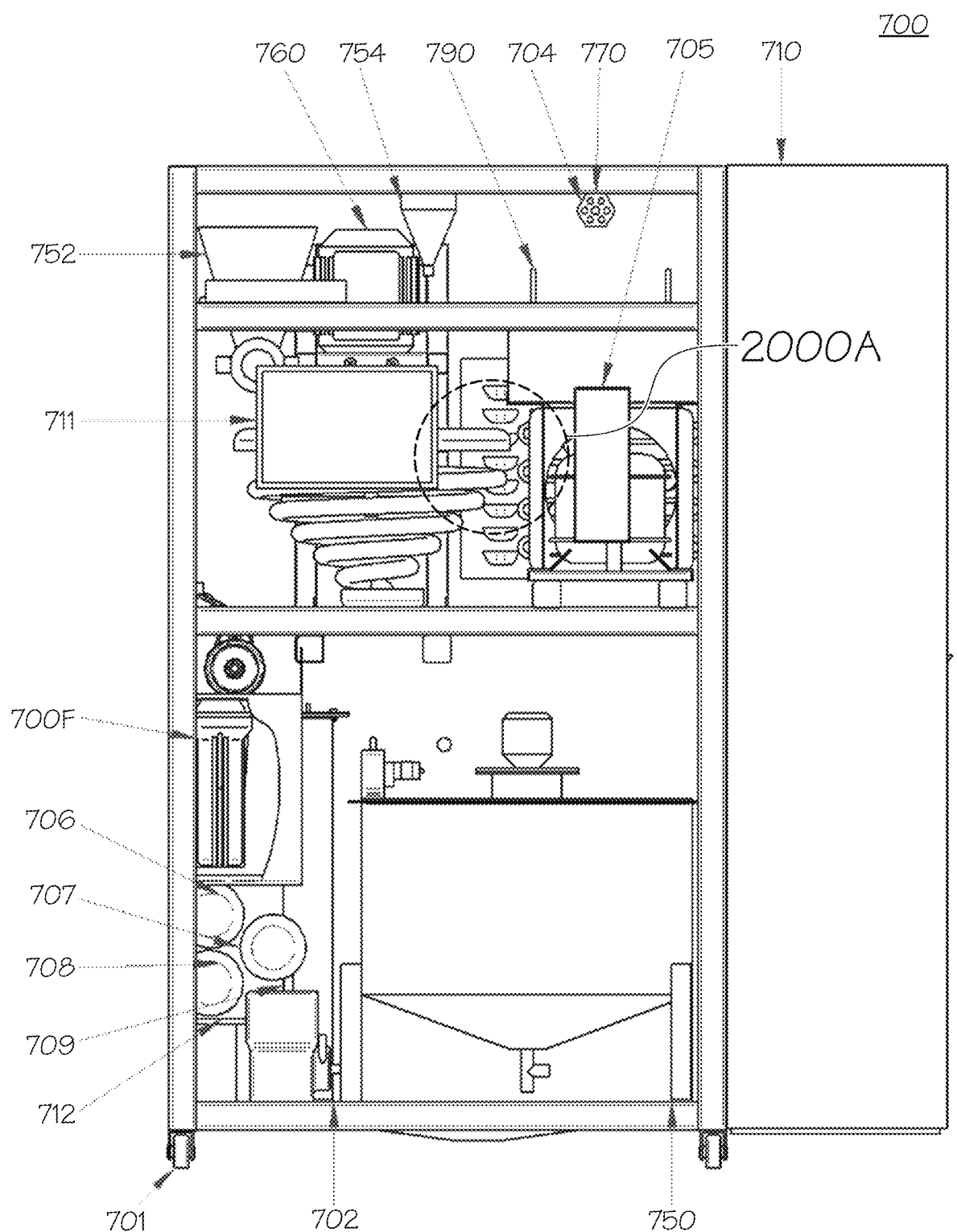
FIG. 17A is an illustration of an exemplary embodiment of the water dispensing system of this invention.
Figure 17B:
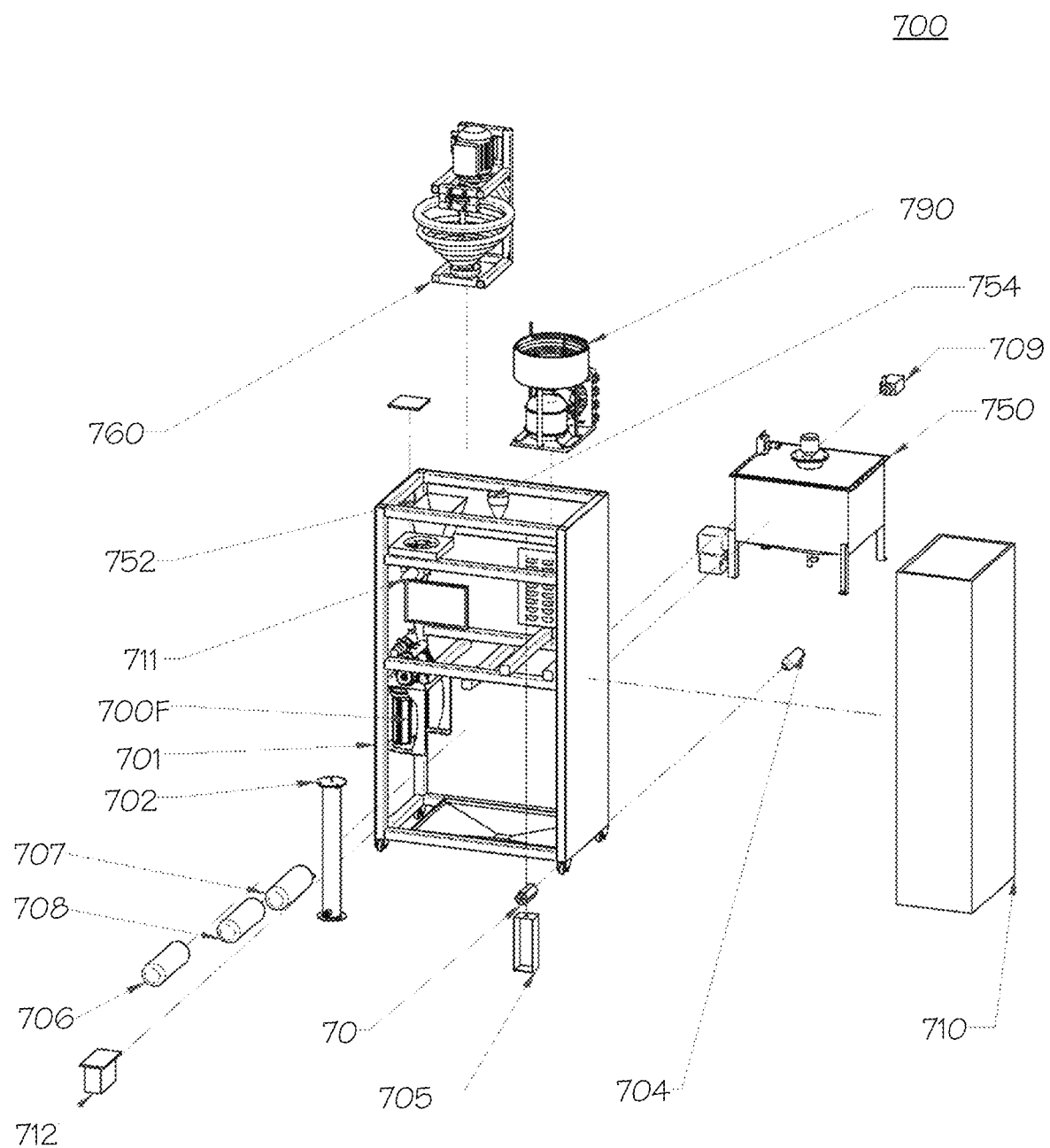
FIG. 17B is an exploded view of the water dispensing system of FIG. 17A.

FIGS. 17A and 17B are illustrations of a water dispensing system 700, incorporating one or more aspects of the water dispensing systems 200-600 described in reference to FIGS.

11-16 above. FIG. 17A depicts a front view of the water dispensing system 700, and FIG. 17B depicts an exploded view of the water dispensing system 700. For the purpose of brevity and clarity of explanation, the water dispensing system 700 and its components will be described in reference to FIG. 17A hereinafter. As shown in FIG. 17A, the water dispensing system 700 may include a housing 701 and a water supply source 710 arranged adjacent to or coupled, directly or indirectly, to the housing 701. The water supply source 710 may be, for example, an atmospheric humidity collector, which condenses and collects the water contained in atmospheric humidity. In one embodiment, the atmospheric humidity collector can include a cooling system that uses radial or axial fans under thermoelectric coolers, or any other cooling means. The atmospheric humidity collector can alternatively or additionally comprise a fixed-bed steam absorption system that is filled with carbon nanotubes, fullerene and other allotropic forms of carbon that are connected to a helical condenser with a nozzle system that generates a difference in pressure that absorbs steam and improves the process of condensation.

In one embodiment, the water dispensing system 700 may include, for example, in the housing 701, a fluid storage 702, and a water filtration system 700F. In some embodiments, the water filtration system 700F may include, as disclosed in the foregoing embodiments, the water filter 20, the reverse osmosis filter 30, and/or the disinfector 40. Further, the water filtration system 700F may include, additionally or alternatively, a nanometric filter. Further, the water structuration system may include a mineral reactor (or MgPLUS unit) 752, a structured water generator 760, a mixer 754, and a mineral supply 750. The structured water generator 760 may also include a vortex structuring system (later described in detail in FIGS. 17C-G). The mineral supply 750 may include one or more pumps to maintain the homogeneity of the desired mineral mixture in the water.

In one embodiment, the water collected by the water supply source 710 (e.g., water supply source 10 and/or condensing-collector 12) may be fed, for example, to the fluid storage 702 in the housing 701, as shown in FIG. 17A. The collected or stored water in the fluid storage 702 may then be sent to the water filtration system 700F (e.g., the water filter 20, the reverse osmosis filter 30, the disinfector 40, and/or a nanometric filter) to filter or purify the water, in accordance with one or more aspects of the present disclosure. The structured water generator 760 may also receive minerals dispensed from the mineral supply 750. The mineral supply 750 may add minerals and/or additives to the water in the structured water generator 760 via a mineral input. The trace elements can include, but are not limited to, calcium (Ca), magnesium (Mg), iron (Fe), zinc (Zn), copper (Cu), selenium (Se), one or more amino acids selected from biotin (vitamin B7), folic acid (vitamin B9), thiamine (vitamin B1), riboflavin (vitamin B2), pyridoxine (vitamin B6), cobalamine (vitamin B12), L-alanine, L-valine, L-isoleucine, L-citrulline, L-glutamine, theanine, and the like, and any suitable metabolite of essential amino acids, such as hydroxymethylbutyrate or β-hydroxy β-methylbutyrate, and the like. The minerals and additives added to the system can be any one or more suitable minerals and additives, including but not limited to, any minerals and additives described in the co-pending application.

In one embodiment, the water dispensing system 700 may comprise a feeder and a discharger (not shown in this figure for clarity of illustration and explanation). The feeder can be any suitable means for feeding a fluid to the water dispensing system 700, including but not limited to a pipe, a tube, a valve, a connecting part, and the like, and can be made of any suitable material. The discharger can be any suitable means for discharging a fluid from the water dispensing system 700, including but not limited to a pipe, a tube, a valve, a connecting part, and the like, and can be made of any suitable material. One or more of the feeder and the discharger can be formed integrally with the other components in the water dispensing system 700 or can be formed separately and connected to the water dispensing system 700 through one or more connecting means. Non-limiting examples of connecting means include flanges, adhesives, welding, and the like.

Still referring to FIG. 17A, the filtered water from the water filtration system 700F may be provided to the mineral reactor 752 and the mixer 754. As described in the foregoing embodiments, the mineral reactor 752 may produce $H_2$ and MgO to be sent to the structured water generator 760. As disclosed in reference to FIG. 12, the mineral reactor 752 may include the container 52A, the motor 52D, the rotator 52B, and a housing 52C. The rotator 52B may be a screw-type mixing device (or auger, drill, screw rod, etc.) attached to the motor 52D. Magnesium may be stored in the container 52A. The magnesium stored in the container 52A may be mixed with water by the rotator 52B, as shown in FIG. 12. The reactor (not shown in this figure for clarity of illustration and explanation) may then produce MgO and $H_2$, which may then be sent to the mixer 754 to be mixed with minerals, additives and/or additional $H_2$, in accordance with the present disclosure. The speed of the mixer 754 (e.g., cyclone mixer) may depend on the desired amount and quality of the water being processed in the structured water generator 760. In one embodiment, an average speed of the water in the mixer 754 (e.g., cyclone mixer) may be set at 10 meters/second and the pressure may be 45 psi. However, the speed and the pressure may be varied, based on the Bernoulli's principle and the desired amount of MgO and $H_2$ output from the mineral reactor 752.

In embodiments, the amount of minerals and/or additives added to the mineral reactor 752 and the minerals and/or additives received by the structured water generator 760 from the mineral supply 750 may vary to produce the structured water in accordance with this disclosure. For example, the amount of minerals and additives necessary for one 12 ounce bottle of water may be different from two 12 ounce bottles of water. As described in the foregoing embodiment, for example, one or more minerals and/or additives received by the structured water generator 760 from the mineral supply 750 can assist in inducing cavitation and/or agitation in the structured water generator 760.

The structuring process of the structured water generator 760 is described further in detail hereinafter. The water from the mixer 754 may be provided to the structured water generator 760 to change the energy structure of the water, by means of agitation and then exposed to cavitation, and subsequent implosion. As disclosed above, the mineral and additives may be added to the structured water generator 760 from the mineral supply 750. The addition of minerals, such as magnesium, improves the generation and/or retention of desired gases (e.g., hydrogen, oxygen, carbon dioxide, etc.) in the water.

The structured water generator 760 may be any device or means that can provoke sufficient cavitation, implosion and/or agitation in the water to induce structuration of the water. The structured water generator 760 may include, as described above, various input and output means to introduce apt-to-drink water, minerals and additives and elements that induce cavitation and/or agitation such as spinning device coupled to the structured water generator 760.

Figure 17C:
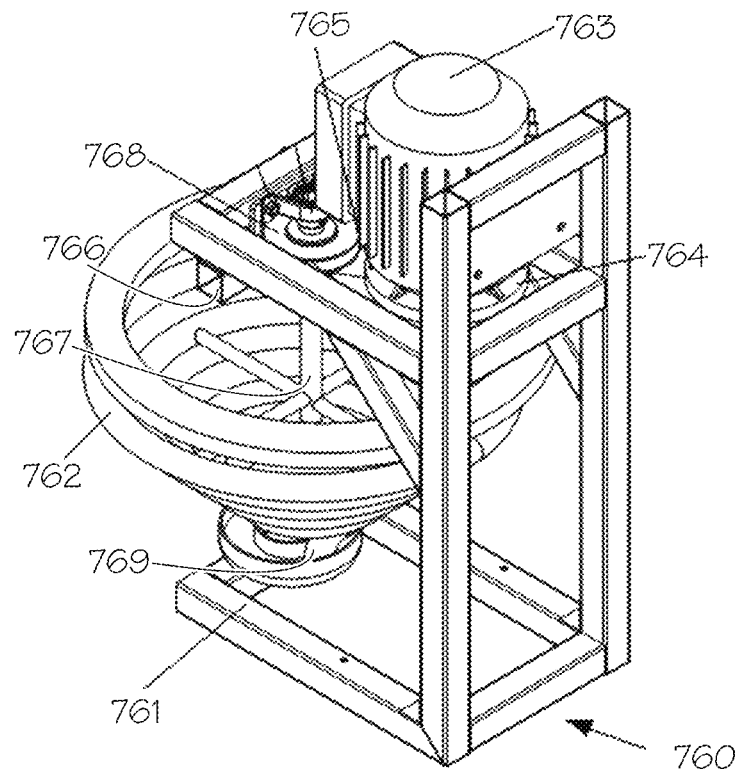
FIGS. 17C-17E are illustrations of various components of the water dispensing system of FIG. 17A.
Figure 17D:
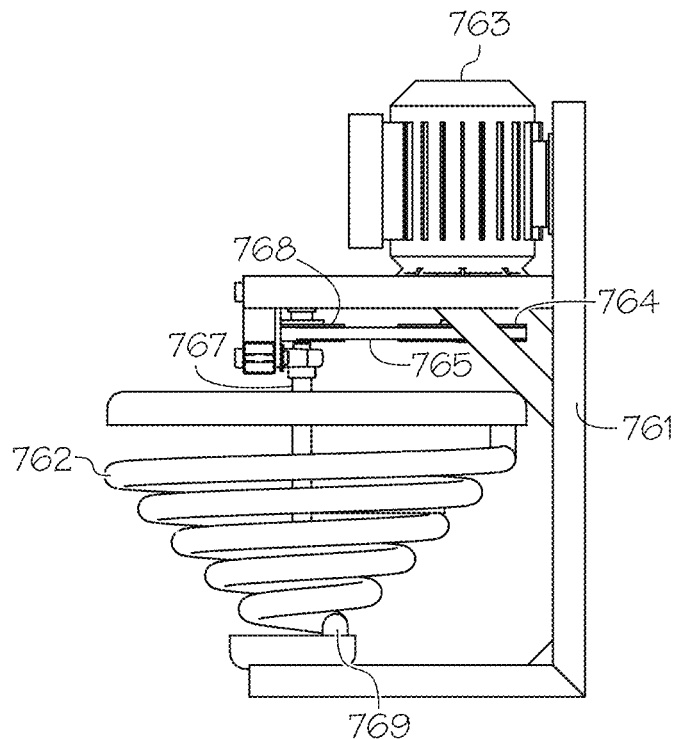
Figure 17E:
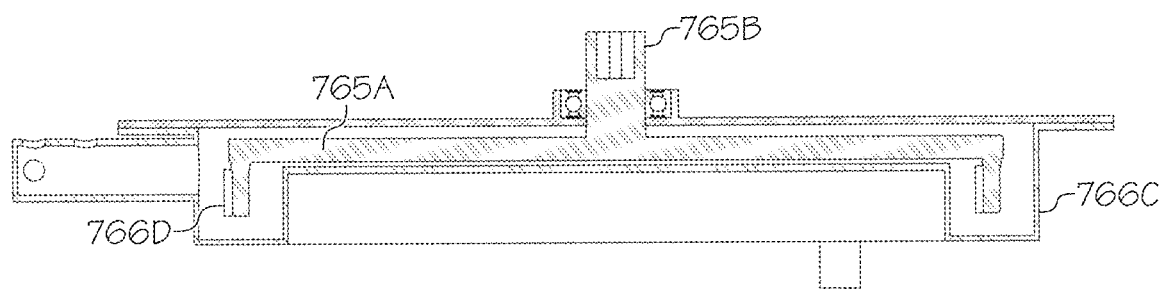
Figure 17F:
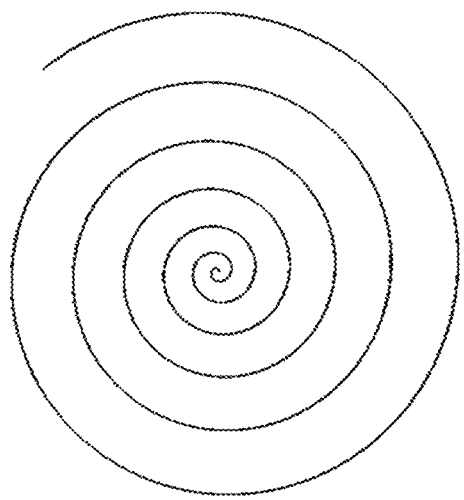
FIGS. 17F-17G are representative illustrations of a vortex generated inside the water dispensing system of FIG. 17A.
Figure 17G:
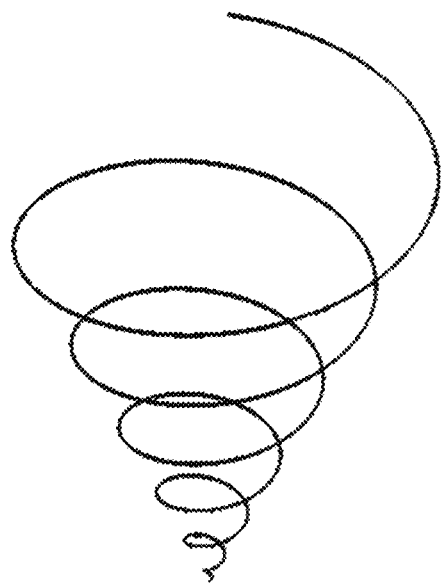

In one embodiment, the structured water generator 760 may comprise a rotating and translating device (i.e. a device that provides structuration to water) that translates and rotates a helical-spiral-shaped container containing water to generate the necessary cavitation and controlled implosion processes for structuring the water. FIGS. 17C-E show an exemplary implementation for the structured water generator 760 including the rotating and translating mechanism. As shown in FIG. 17C, the structured water generator 760 may include a housing (or a bracket or frame) 761. In or on the housing 761, the structured water generator 760 may include a motor 763, a first wheel 764, a second wheel 768, and a belt 765 that is fitted into the groove of each of the first wheel 764 and the second wheel 768, as shown in FIGS. 17C and 17D. The combination of the first wheel 764, the second wheel 768, and the belt 765 may be referred to as a rotation generator. The first wheel 764 and the second wheel 768 may have different diameters to multiply the speed or torque generated by the pully system. For example, the first wheel 764 may be a 6-inches wheel, and the second wheel may be a 4-inches wheel, but are not limited thereto, and any suitable size and number of wheels can be used in the rotation generator.

In one embodiment, the motor 763 that is coupled to the first wheel 764 that rotates to provide sufficient rotational and translational movements of the structured water generator 760 at a frequency greater than 300 Hz. These movements lead to a phase change from water into steam that generates the necessary cavitation and controlled implosion processes of the present disclosure. In one embodiment, the motor 763 may include, as shown in FIG. 17E, a rotation element 765A in a housing 766C of the motor 763. The rotation element 765A may include one or more magnets 766D that facilitates the rotation of the rotation element 765A. The motor 763 may include one or more coils for generating a magnetic field to generate rotational force against the one or more magnets 766D. The motor 763 may include a shaft 765B that may be connected to the first wheel 764 to rotate of the first wheel 764 for facilitating the structuration process in accordance with the present disclosure.

Referring back to FIG. 17C, the structured water generator 760 may comprise a conical-shaped (or spiral-shaped) container (or tank) 762 having an input opening 766, which may be coupled, directly or indirectly, to the mixer 754, structured water generator 760, mineral supply 750, and/or water supply source 710 to receive desired fluid and/or minerals to facilitate structuration of water in accordance with one or more aspects of the present disclosure. The conical-shaped container 762 may be, for example, a helical-spiral-shaped tube (i.e. a tube that has the form of a helical spiral). The structured water generator 760 may comprise an output opening 769 to output structured water from the conical-shaped container 762. In one embodiment, the conical-shaped container 762 may have a capacity of 15 to 50 liters. The structured water generator 760 may include a shaft 767, which may include rods (or blades) that are connected to one or more internal surfaces of the conical-shaped container 762, as shown in FIG. 17C. The shaft 767 may be connected to the motor 763 that rotates at high revolutions to generate a vortex, which allows the water to produce the phenomenon of cavitation and consequently an implosion of each bubble generated in the conical-shaped container 762.

As shown in FIGS. 17C and 17D, the one or more screws and nuts, as well as other suitable fastening elements, may be utilized to securely arrange the components of the structured water generator 760 in the housing 761. That is, the components of the structured water generator 760 shown in FIGS. 17C and 17D may be attached or coupled to the housing 761 in the manner sufficient to support translational and rotational movements of the conical-shaped container 762 at high speeds. The translational and rotational movement will be described with reference to FIG. 20. The translational and rotational movements of the conical-shaped container 762 allows the water molecules in the conical-shaped container 762 to reach temperatures above 5000 K. In some embodiments, the temperatures could triple depending on the energy generated from the translation and rotational movements. The onset of cavitation exhibits a great dependence on the coherent structure of directed flow, which is organized as paired (or concentric) vortex rings shown in FIGS. 17F and 17G. In addition, cavitation/implosion may continuously occur in the nucleus of the vortex, indicating a strong correlation between said cavitation/implosion and vortex dynamics. In the initial stage, the stretching of the vortex may be the dominant factor, responsible for the growth of the vortex and the elliptical shape of the cavitation ring. In comparison, the dilation term could produce enhancement or suppression of local vorticity, depending on the volumetric variation induced by cavitation and, during the implosion stage, the bubbles create baroclinic vorticity and contribute to three-dimensional vorticity. The exposure to cavitation and/or implosion homogenize the mix. In one embodiment, structuration or homogenization of the mix may be achieved through ultrasonic mixing or exposure to a vacuum pressure difference. The periodic functioning of the implosion structure together with the temporal evolution of large eddies, vorticity may be separated into, for example, the following 9 stages: initiation, collision, growth, cavitation cloud, loss of coherence, cavitation cloud growth, collision, implosion and water restructuring. In one embodiment, the linear flow rate necessary to start the water restructuring process may be in the range between 30 m/s to 300 m/s.

Still referring to FIG. 17A, the water dispensing system 700 may include a magnetizer 770 and a dispensing module 705. The magnetizer 770 may include, for example, any means or device that generates a magnetic field sufficient to configure the magnetic field of the water in a desired manner. For example, the magnetizer 770 may include, but not limited thereto, neodymium magnets or other magnetization means, such as one, or a combination, of the following: magnets of metals such as iron (Fe), cobalt (Co), and/or nickel (Ni); naturally magnetic minerals that are called "calamites" that are composed mostly of iron; and/or electromagnets. The arrangement of magnets of neodymium, or other materials may be arranged in the water dispensing system 700, is in accordance with the desired design or functionality of water dispensing system. Additionally or alternatively, the magnetizer 770 may align the water molecules by generating an electromagnetic field in a conductive material that produces magnetization by induction. After the water leaves the structured water generator 760, the water may be magnetized by the magnetizer 770 with neodymium magnets, then gases such as oxygen, hydrogen or carbon dioxide may be added, before being cooled and finally dispensed to a container for consumption.

Still referring to FIG. 17A, the water dispensing system 700 may include, in the housing 701, a gas supply including, for example, at least one of a $H_2$ storage 706, an O2 storage 707, and a CO2 storage 708, a hydrogen generation cell 712, or a combination thereof. The water dispensing system 700 may also include a cooling system 790, a main control system 711, a compressor 709, and a UV filter 704.

In one embodiment, the gas supply (e.g., $H_2$ storage 706, $O_2$ storage 707, $CO_2$ storage 708, and/or hydrogen generation cell 712) may add one or more gasses (e.g., oxygen, hydrogen, carbon dioxide, nitrogen, or a combination thereof) to the water that may be treated by the structured water generator 760. In one embodiment, the gas supply may include means or structure (e.g., hydrogen generation cell 712) to perform separation of water into gaseous oxygen and hydrogen using electrolysis or other processes, and means or structure for gas storage, such as cylinders or pressurized tanks. In one embodiment, before the gas supply adds one or more gasses to the treated water, the UV filter 704 may disinfect or sterilize the structured water from processed from the structured water generator 760. Additionally, the water may be cooled by the cooling system 790 before being dispensed for consumption by the dispensing module 705. The cooling system 790 can also be used to cool the water supplied to the structured water generator 760 to a temperature of 4° C.

As described above, FIG. 17B depicts an exploded view of the water dispensing system 700 according to one or more aspects of the present disclosure. FIG. 17B illustrates one exemplary arrangement of the components of the water dispensing system 700. Of course, other arrangements of the components may be possible to facilitate the desired operation of the water dispensing system 700. Since the water dispensing system 700 shown in FIG. 17B includes the same or similar components as describe in the water dispensing system 700 shown in FIG. 17A, the descriptions of the same components shown in FIG. 17A are omitted accordingly for brevity and clarity of explanation. In embodiments, the water dispensing system 700 of FIGS. 17A and 17B may comprise various feeders and/or dischargers coupled to various components of the water dispensing system 700 shown in FIG. 17B, to facilitate operation of the water dispensing system 700, in accordance with one or more aspects of the present disclosure. The feeders can be any suitable means for providing fluids, minerals, and/or other materials necessary to facilitate operation of the water dispensing system 700, including but not limited to a pipe, a tube, a valve, a connecting part, and the like, and can be made of any suitable material. The dischargers can be any suitable means for discharging fluids, minerals, and/or other materials necessary to facilitate operation of the water dispensing system 700, including but not limited to a pipe, a tube, a valve, a connecting part, and the like, and can be made of any suitable material. One or more of the feeder and the discharger can be formed integrally with the water dispensing system 700 or can be formed separately and connected to the water dispenser through a connecting means. Non-limiting examples of connecting means include flanges, adhesives, welding, and the like.

Figure 18A:
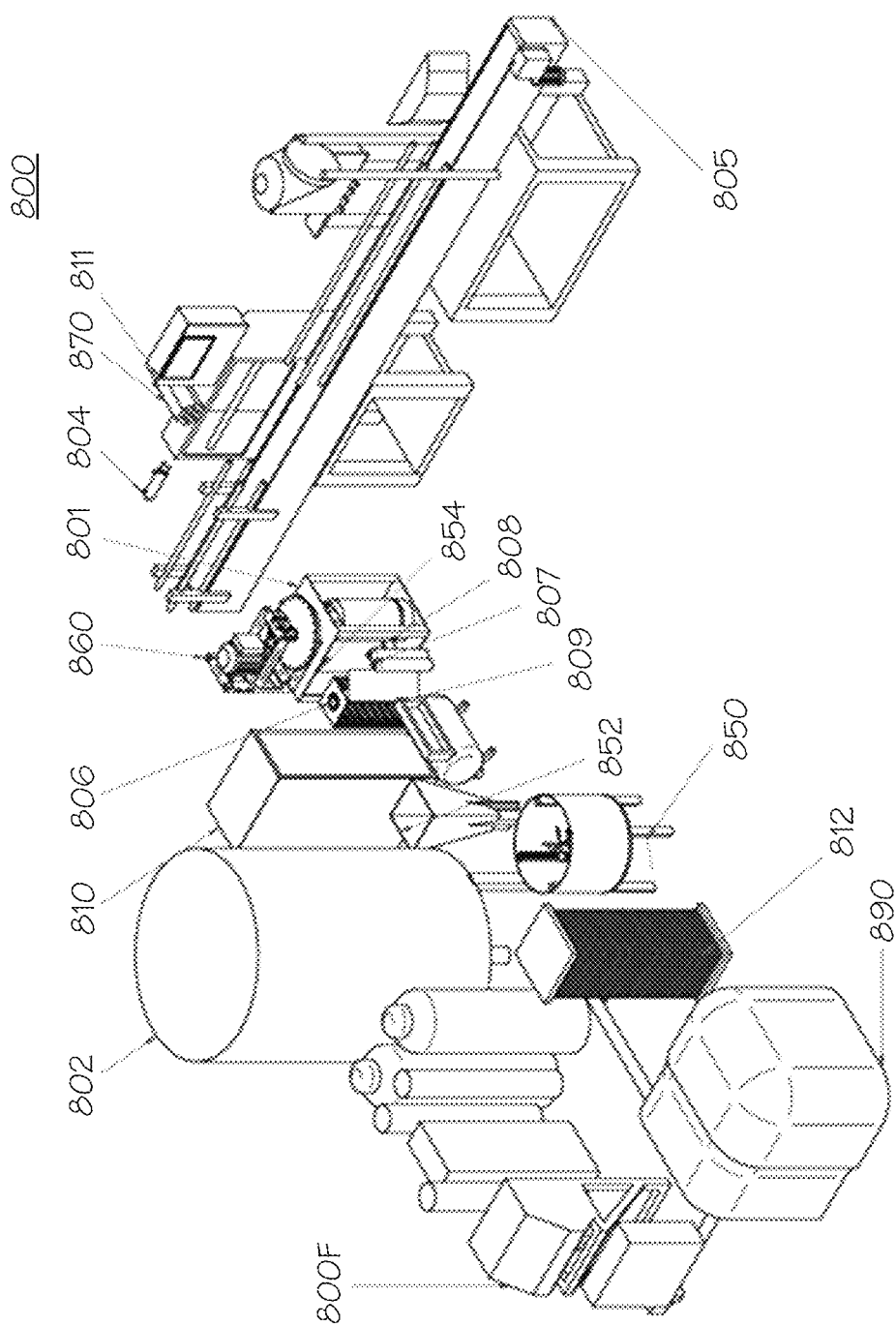
FIGS. 18A-18B are illustrations of a large-scale water dispensing system according to another exemplary embodiment of this invention.
Figure 18B:
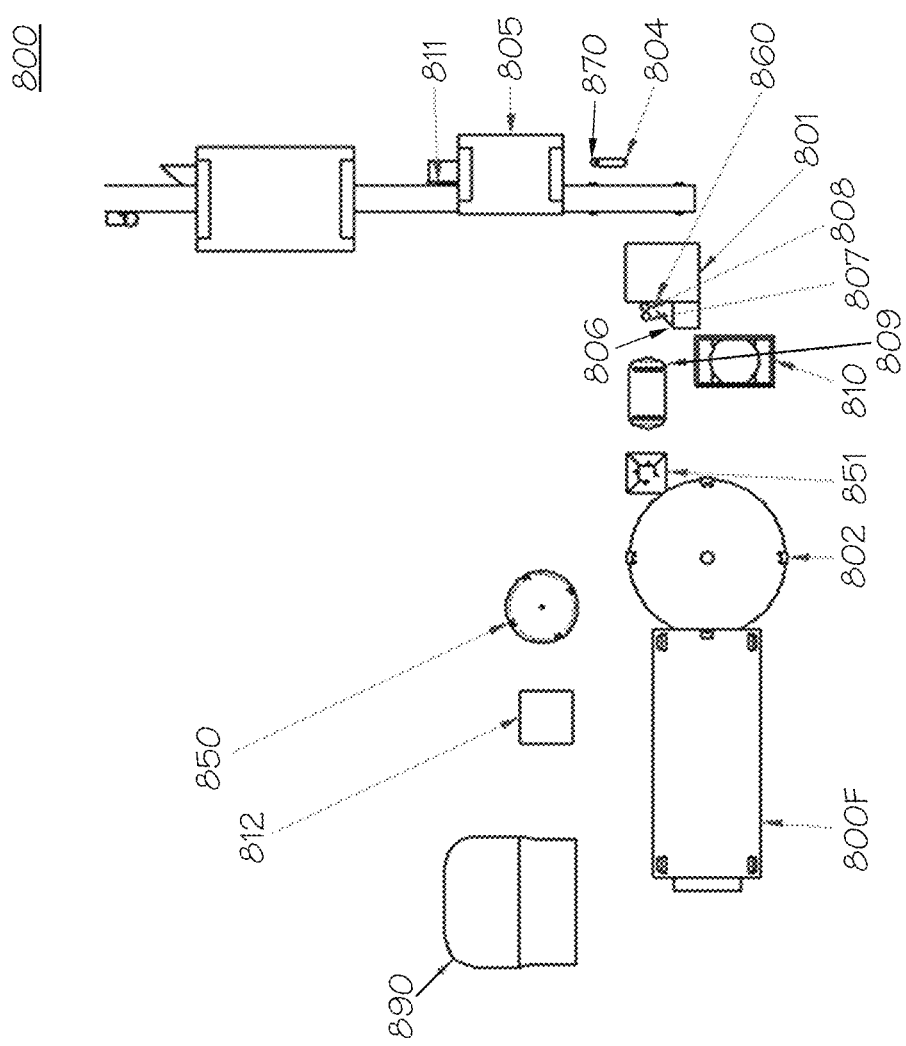

FIGS. 18A and 18B are illustrations of a large-scale water dispensing system 800. In one embodiment, the water dispensing system 800 may include a water filtration system 800F, a housing 801, a fluid storage 802, a UV filter 804, a dispenser 805, an $H_2$ storage 806, an $O_2$ storage 807, $CO_2$ storage 808, a hydrogen generating 809, a water supply source 810, a main control system 811, a hydrogen generation cell 812, a mineral supply 850, a mineral reactor (or MgPLUS unit) 852, a mixer 854, a structured water generator 860, a magnetizer 870, and a cooling system 890. Although the size, shape, and placement (or arrangement) of the components shown in FIGS. 18A and 18B may be different from the components of the water dispensing system 700 shown in FIGS. 17A-E, the components of the water dispensing systems 700 and 800 are scalable and modifiable to yield the same structured water in accordance with the present disclosure. As such, the detailed descriptions of each of the components of the water dispensing system 800 are omitted with respect to FIGS. 18A and 18B for brevity. FIG. 18A is a perspective of the large-scale water dispensing system 800, and FIG. 18B is a top down view of the large-scale water dispensing system 800.

Figure 19A:
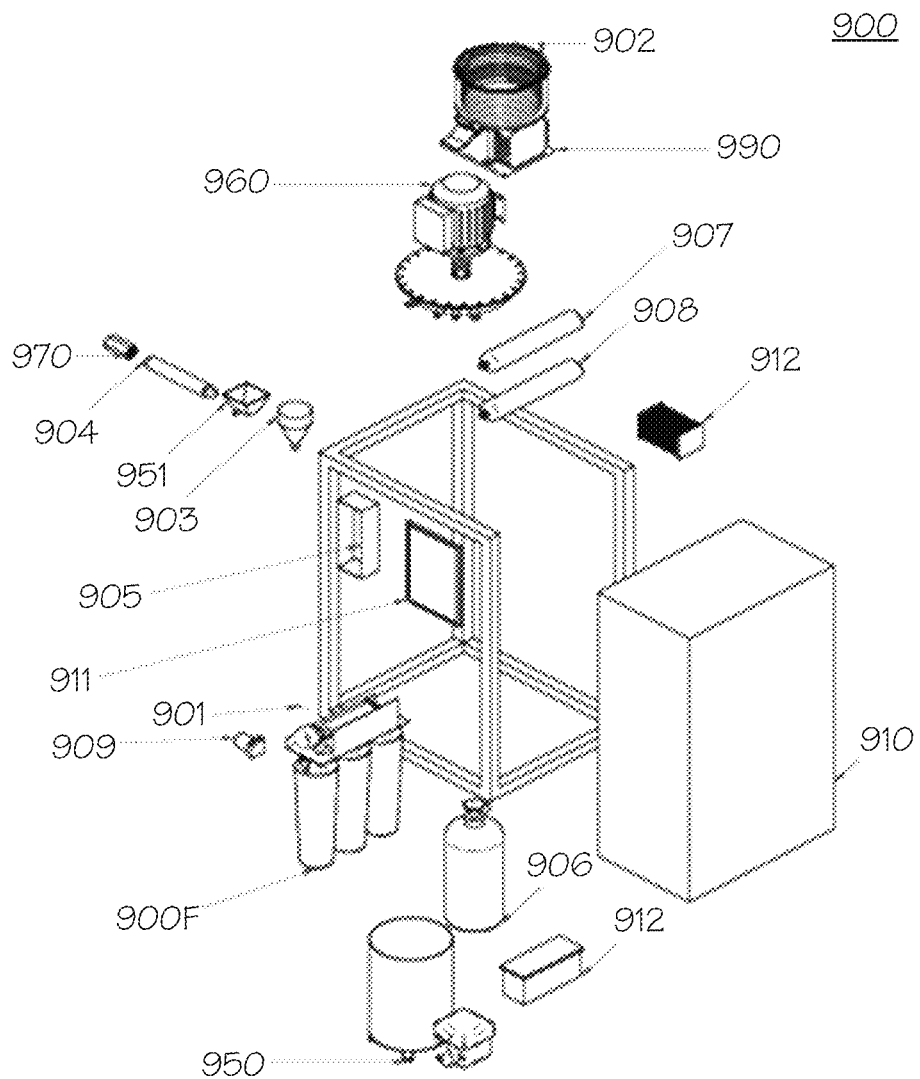
FIGS. 19A-19C are illustrations of a compact water dispensing system according to another exemplary embodiment of this invention.
Figure 19B:
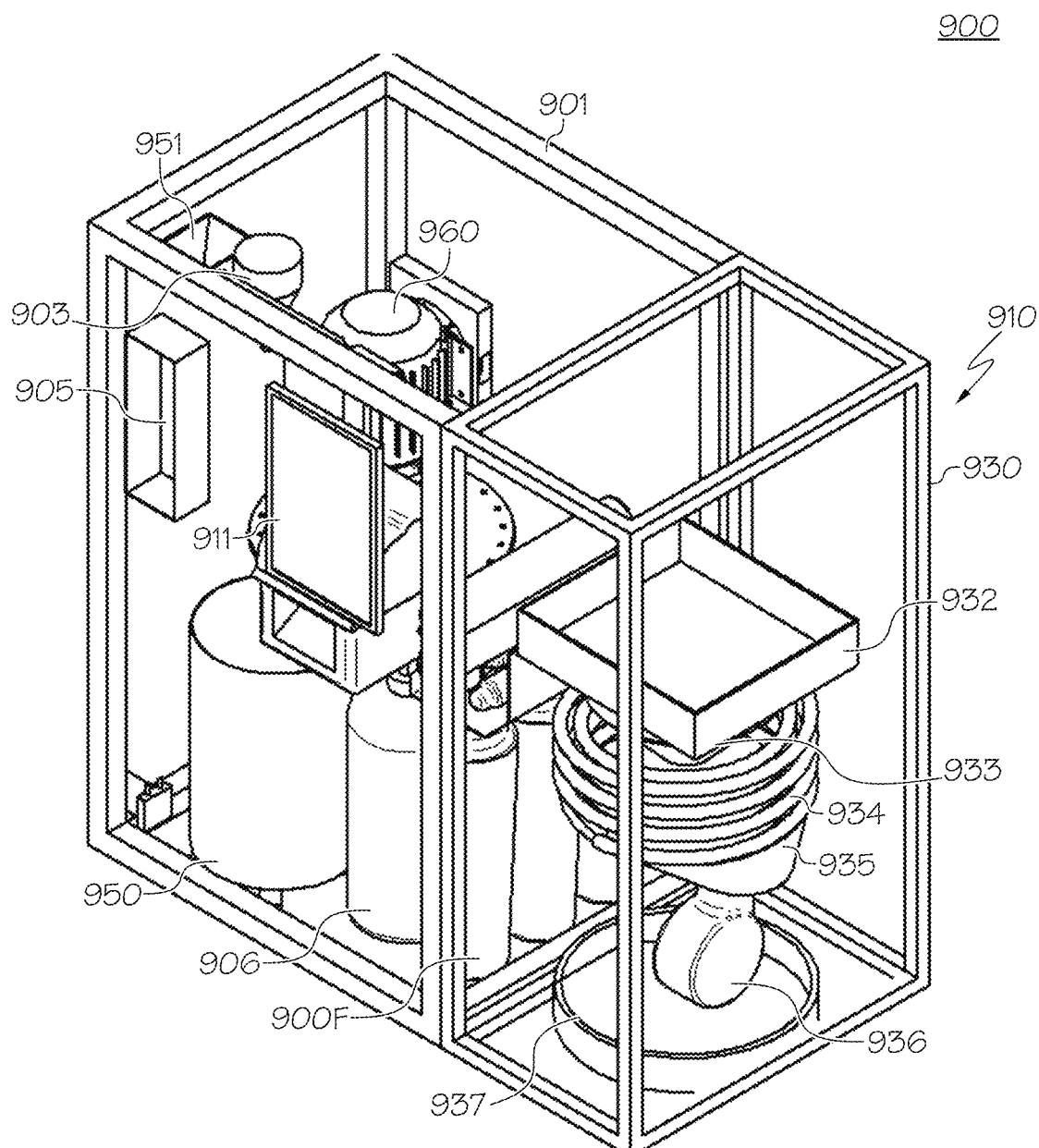

FIGS. 19A and 19B are illustrations of a compact version of a water dispensing system 900, according to one or more aspects of the present disclosure. In one embodiment, the water dispensing system 900 may include a water filtration system 900F, a housing 901, a fluid storage 902, a UV filter 904, a dispenser 905, an $H_2$ storage 906, an $O_2$ storage 907, $CO_2$ storage 908, a water supply source 910, a main control system 911, a hydrogen generation cell 912, a mineral supply 950, a mineral reactor (or MgPLUS unit) 903, a mixer 951, a structured water generator 960, a magnetizer 970, and a cooling system 990. Although the size, shape, and placement (or arrangement) of the components shown in FIGS. 19A and 19B may be different from the components of the water dispensing systems 700 and 800 shown in FIGS. 17A-E and 18A-B, the components of the water dispensing systems 700-900 are scalable and modifiable to yield the same structured water in accordance with the present disclosure. As such, the detailed descriptions of each of the components of the water dispensing system 900 are omitted with respect to FIG. 19A for brevity. FIG. 19A is an exploded view of the compact water dispensing system 900, and FIG. 19B is a perspective view of the large-scale water dispensing system 800.

Figure 19C:
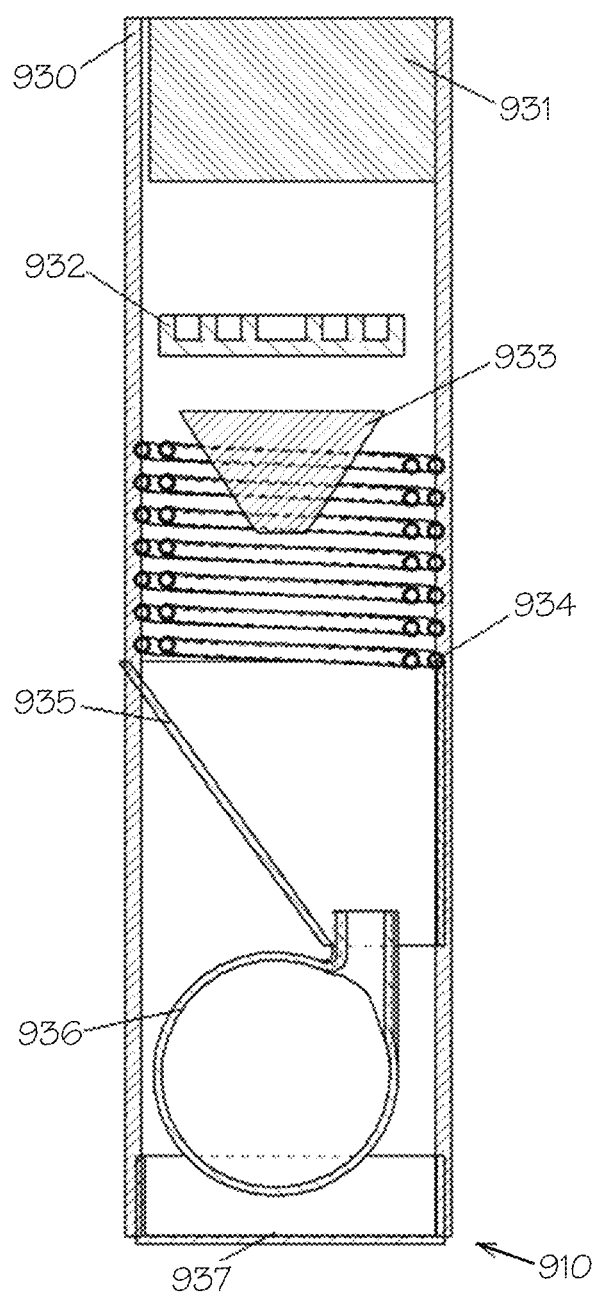

FIGS. 19B and 19C illustrate the components of the water dispensing system 900 and the water supply source 910. The components in the water supply source 910 may be incorporated into the water supply sources of the systems 200-800 in FIGS. 11-18B, in accordance with the present disclosure. In one embodiment, the water supply source 910 may be a condensation and extraction system. When the water supply comes from moisture in the environment, the water supply source 910 can comprise an optimized condensation system with an extraction system that allows capturing water from the atmosphere by two main elements, a condensation system and an extraction system.

The water supply source 910 may include a condensation system housing 930, a cooling system 932, and a steam absorber 933, and a condenser 934. In one embodiment, the cooling system 932 may be a semiconductor-based electronic component that functions as a small heat pump based on the Peltier effect. By applying a low DC electrical voltage to it, one side of the device will be cooled while the other side will be heated simultaneously. This device is used to improve the coefficient of performance (COP) of the module and improves the heat transfer rate (i.e. increases the ability of heat transfer). The steam absorber 933 may be a fixed-bed steam absorber, which absorbs steam, that is filled with carbon nanotubes, fullerene and other allotropic forms of carbon that are connected to the condenser 934. The condenser 934 may be a helical-spiral-shaped housing, and the condenser 934 may be connected to a nozzle system 935, which improves the process of condensation. In one embodiment when a helical-spiral-shaped housing is used as the condenser 934, the cooling system 932 (e.g., thermoelectric cooler) can alternatively be attached to the condenser 934 (e.g., helical-spiral-shaped housing) for allowing a better arrangement of the thermoelectric cells. The condenser 934 (e.g., helical-spiral-shaped housing) can be located above an air flow that is injected by an extractor for condensation. The water supply source 910 may also include an air extractor 936, and a storage container 937.

Figure 20:
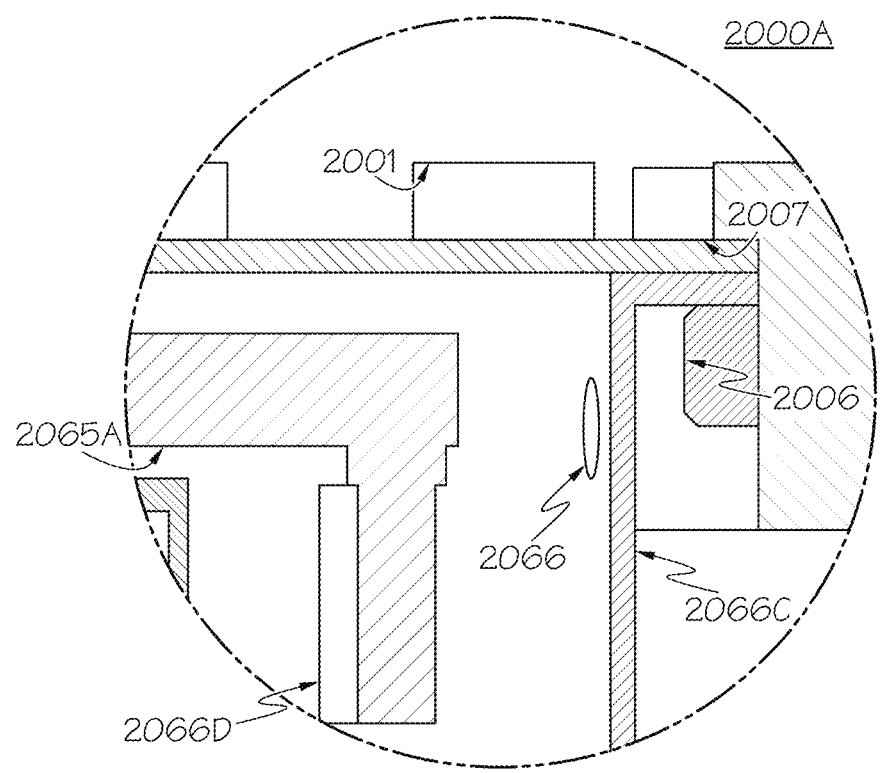
FIG. 20 is a cutaway view of section 2000A of the water dispensing system of FIG. 17A.

FIG. 20 is a cutaway view of area 2000A of the water dispensing system 700, and shows the attachment of the structured water generator 760 to the water dispensing system 700, and illustrates the movement of the various parts, for example, the conical-shaped (or spiral-shaped) container (or tank) 762, during the cavitation process. For example, as shown in FIG. 20, the water dispensing system 700 includes a primary fastening system 2001, a rotation element 2065A, an input opening 2066, one or more magnets 2066D (high energy solid), a housing 2066C for the rotation element 2065A, a secondary fastening system 2006, and a sealer 2007. In an exemplary embodiment, the primary fastening system 2001 is a mechanical temporary fixing device that, by means of a torsional force, is responsible for joining the housing 2066C and the sealer 2007. The rotation element 2065A guides the rotational movement of the one or more magnets 2066D by conveying torque and force. The input opening 2066 includes a hole for injecting fluid, minerals and/or additives into the apparatus. The input opening 2066 is not limited, and any suitable input for materials to be added to the water dispensing system can be used.

The one or more magnets 2066D (high energy solid) are responsible for displacing fluid inside the structured water generator 760 at high speeds, which generates turbulent flow and current trajectories that can be derived in circular and helical forms, thereby generating an empty area where high pressures and high temperatures can be found inside the structured water generator 760. The one or more magnets 2066D (high energy solid) along with the sealer 2007 are also responsible for avoiding leaks produced at high pressures, which prevents depressurization and ensures a hermetic system within the water dispensing system 700, including the structured water generator 760, while also providing rigidity to the system. The secondary fastening system 2006 is a mechanical element that allows for the containment and fixing of removable elements.

As disclosed on the foregoing embodiments, when the water supply is not suitable for consumption, embodiments of the water dispensing systems of the present disclosure may include one or more filters or disinfectors. Non-limiting examples of filters include inverse osmosis filters, reverse osmosis filters, activated carbon, filters that contain activated carbon, and the like. Any suitable filter or device can be used. Non-limiting examples of disinfectors include ultra-violet light emission, ozone sources, and/or chemical disinfectants, including but not limited to chlorine. However, the use of chemical disinfectants is not preferred, as they can be harmful to health, or the consumer can prefer water without said chemicals.

In another exemplary embodiment, the water dispensing systems of the present disclosure can include an ion exchange filter that extracts any undesirable ions from various metallic compounds. For example, in one embodiment, the ion exchange filter can be selected to remove carbonates from the water source. Such carbonates are hard water salts that can form undesirable lime deposits on the interior walls of the various components of the water dispensing system. The ion exchange filter is not limited, and any suitable ion exchange filter can be used.

In one embodiment, the water dispensing systems of the present disclosure can additionally include cation exchange membranes when the water dispensing device includes a reverse osmosis filter to remove salts from the water being processed therein.

Figure 21:
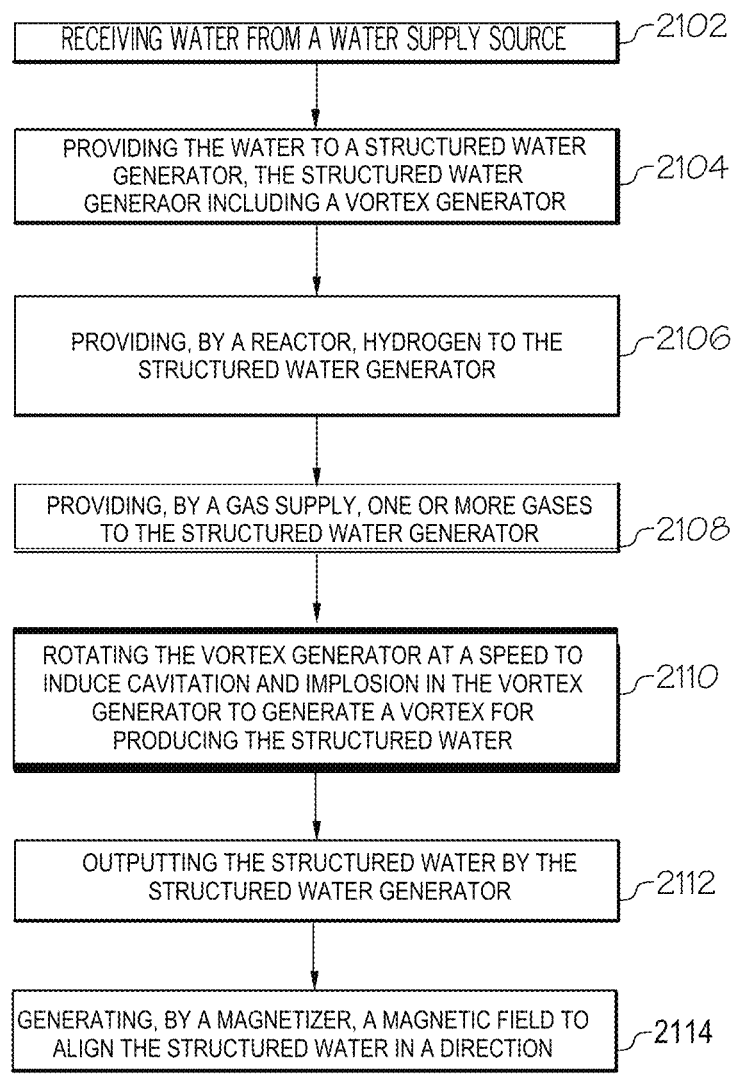
FIG. 21 is a flowchart of a method for forming structured water of this invention.

FIG. 21 depicts a flowchart of an exemplary method 2100 for producing structured water by a water dispensing system, in accordance with one or more aspects of the present disclosure. The water dispensing system performing the method 2100 may utilize any of the systems and components described above in reference to FIGS. 11-20 to produced structured water in accordance with the present disclosure. At step 2102, a water dispensing system device of the present disclosure may receive water from a water supply source. In one embodiment, the water supply source may be include a condenser, which may generate water from humidity in the atmosphere. In one embodiment, the water received via the water supply source may be filtered by a water filtration system. At step 2104, the water may be provided to a structured water generator. The structured water generator may include a vortex generator. In one embodiment, the water may also be transferred to a mixer and/or a mineral reactor (e.g., MgPLUS unit). The water transferred to the structured water generator, mixer, and/or the mineral reactor may be from the water supply source and/or from the water filtration system. In one embodiment the mineral reactor may generate MgO and $H_2$ from the received water. At step 2106, a reactor may provide hydrogen to the structured water generator. In one embodiment, the mixer may mix MgO and $H_2$ received from the mineral reactor with the filtered water received from the water filtration system. In one embodiment, the mixer may mix any suitable water that does not require filtration with MgO and $H_2$ received from the mineral reactor. In one embodiment, the mixer may mix any suitable water and $H_2$ received from a gas supply. In some embodiments, the mixer may mix, with any suitable water, MgO and $H_2$ received from the mineral reactor and $H_2$ received from a gas supply. In one embodiment, a mineral supply may transfer one or more minerals and/or additives to the structured water generator. For example, the minerals and/or additives may be the same as disclosed in the foregoing embodiments.

Still referring to FIG. 21, at step 2108, a gas supply may provide one or more gases to the structured water generator. In one embodiment, the water may be transferred to the structured water generator from the water received from the water supply source, the water filtration system and/or a fluid mixture may be received from the mixer. At step 2110, the vortex generator may be rotated at a speed to induce cavitation and implosion in the vortex generator to generate a vortex for producing the structured water. In one embodiment, the cavitation and agitation may be generated by a vortex generator of the structured water generator. The vortex generator may be configured to rotate at, for example, 3600 rpm to generate an average linear speed of water of about 30 m/s to about 60 m/s, and preferably 50 m/s. Further, the vortex generator may be configured to maintain an internal pressure that is less than 2 kPa absolute. In another embodiment, the vortex generator may be configured to generate an average linear speed of water at 10 m/s, and may be configured to maintain an internal pressure of 45 psi. In one embodiment, the structured water generator may structurize the filtered water received from the water filtration system and/or the fluid mixture received from the mixer. Alternatively, the structured water generator may structurize only the fluid mixture received from the mixer. In one embodiment, structured water generator may structurize any suitable water received from the water supply source, water filtration system, and/or the mixer with one or more minerals received from the mineral supply. At step 2112, the structured water generator may output the structured water.

At step 2112, a magnetizer may generate a magnetic field to align the structured water in a direction. In one embodiment, the magnetizer may generate a magnetic field to rearrange the molecules in the structured water to be close to each other to yield a better tasting and longer lasting structured water. In one embodiment, a UV filter may disinfect or sterilize the structured water that is magnetized and/or the gas supply may add one or more gases to the structured water that is magnetized. For example, the one or more gases may include oxygen, hydrogen, carbon dioxide, nitrogen or a combination thereof. In one embodiment, a cooling system may cool the structured water that is magnetized to a desired temperature.

In one embodiment, a main control system may automatically or manually facilitate the water structuration method in accordance with the present disclosure, including method 2100. For example, the water dispensing system of the present disclosure may include one or more user interfaces. The user interfaces may be a display, knob, button, lever, touchscreen, and/or any other suitable input terminal configured to receive user inputs for initiating the water structuration process of the present disclosure. The main control system may be connected, directly or indirectly, to the components of the water dispensing system of the present disclosure to facilitate electrical and mechanical control and/or actuation of the components of the water dispensing system for performing the structuring and dispensing of the structured water. The main control system may include one or more processors and instructions executable by the one or more processors that may be stored on a non-transitory computer-readable medium. Therefore, whenever a computer and/or processor (e.g., automated or manual control of the water dispensing system by a control system) implemented method is described in this disclosure, this disclosure shall also be understood as describing a non-transitory computer-readable medium storing instructions that, when executed by one or more processors, configure and/or cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

The structured water dispensed from the device described in this application is fully described in the co-pending application, which is incorporated by reference as if fully set forth herein.

As various changes could be made in the above methods and compositions without departing from the scope of the disclosure, it is intended that all matter contained in the above description shall be interpreted as illustrative and not in a limiting sense. Any numbers expressing quantities of ingredients, constituents, reaction conditions, and so forth used in the specification are to be interpreted as encompassing the exact numerical values identified herein, as well as being modified in all instances by the term "about." Notwithstanding that the numerical ranges and parameters setting forth, the broad scope of the subject matter presented herein are approximations, the numerical values set forth are indicated as precisely as possible. Any numerical value, however, may inherently contain certain errors or inaccuracies as evident from the standard deviation found in their respective measurement techniques. None of the features recited herein should be interpreted as invoking 35 U.S.C. § 112, paragraph 6, unless the term "means" is explicitly used.

What is claimed is:

1. A water dispensing device, comprising:
    a housing;
    a water supply source coupled to the housing;
    a water filtration system in the housing, the water filtration system receiving water from the water supply source to output filtered water;
    a structured water generator coupled to the water filtration system to receive the filtered water and configured to output structured water, the structured water generator comprising:
        a motor;
        a rotation generator coupled to the motor; and
        a vortex generator coupled to the rotation generator by a shaft, the vortex generator being configured to rotate at a first speed based on a rotational speed of the rotation generator, wherein the vortex generator comprises a spiral tube, and the vortex generator is configured to generate the structured water in accordance with the first speed;
    a mineral reactor coupled to the structured water generator and the water supply source, the mineral reactor being configured to generate MgO and $H_2$ and to transfer the MgO and $H_2$ to the structured water generator, wherein the mineral reactor includes:
        a container configured to store magnesium; and
        a rotator coupled to the container,
        wherein the rotator is configured to mix the magnesium with the filtered water received from the water filtration system to generate the MgO and $H_2$;
    a gas supply coupled to the structured water generator, the gas supply being configured to provide one or more gases to the structured water generator, wherein the one or more gases comprise at least one of oxygen, hydrogen, carbon dioxide, or nitrogen;
    a magnetizer coupled to the structured water generator, the magnetizer being configured to generate a magnetic field to align the structured water in a direction; and
    a dispenser coupled to the magnetizer, the dispenser being configured to dispense the structured water.

2. The water dispensing device of claim 1, wherein the rotator is a cyclone mixer configured to mix the MgO and $H_2$ with the filtered water at a second speed.

3. The water dispensing device of claim 1, wherein the rotation generator comprises a first wheel and a second wheel, and
    wherein a diameter of the first wheel is greater than a diameter of the second wheel.

4. The water dispensing device of claim 1, wherein the spiral tube has a conical shape.

5. The water dispensing device of claim 1, wherein the rotator includes a screw-type mixing rod configured to mix the MgO and $H_2$ with the filtered water.

6. The water dispensing device of claim 1, wherein the first speed is 1800 rpm to 7000 rpm.

7. The water dispensing device of claim 1, wherein the water filtration system comprises a water filter, a reverse osmosis filter, and a disinfector.

8. The water dispensing device of claim 7, wherein the reverse osmosis filter comprises at least one cation exchange membrane for removing salts.

9. The water dispensing device of claim 7, wherein the disinfector comprises an ultraviolet light source.

10. The water dispensing device of claim 7, wherein the water filter comprises at least one of a sediment filter, a granular activated carbon filter, or a compact activated carbon filter.

11. The water dispensing device of claim 1, wherein the water supply source comprises a condenser and a collector for condensing and collecting atmospheric moisture.

12. The water dispensing device of claim 11, wherein the condenser and the collector are arranged prior to the structured water generator.

13. The water dispensing device of claim 11, wherein the condenser comprises a cooling system, and
wherein the cooling system comprises at least one of a radial fan, an axial fan or a thermoelectric cooler.

14. The water dispensing device of claim 1, wherein the magnetizer comprises one or more neodymium magnets.

15. The water dispensing device of claim 1, wherein the gas supply further comprises a hydrogen generator that produces hydrogen.

16. The water dispensing device of claim 1, wherein the mineral reactor produces the $H_2$ via a chemical reaction between magnesium and the filtered water according to the following reaction:

$$Mg + H_2O \rightarrow MgO + H_2.$$

17. The water dispensing device of claim 16, wherein the magnesium comprises granular magnesium having a particle size of 0.01 mm to 1 mm.

18. A system for dispensing gasified structured water, the system comprising:
the water dispensing device of claim 1 to produce the structured water, wherein the gas supply of the water dispensing device further is configured to provide one or more gases to the structured water discharged from the magnetizer to produce a gasified structured water, wherein the one or more gases comprise at least one of oxygen, hydrogen, carbon dioxide, or nitrogen; and
a cooling system to cool the structured water discharged from the magnetizer and/or the gasified structured water before being dispensed from the dispenser.

19. A water dispensing device, comprising:
a housing;
a coupling to connect a water supply source;
a water filtration system in the housing, the water filtration system receiving water from the water supply source to output filtered water;
a structured water generator coupled to the water filtration system to receive the filtered water and configured to output structured water, the structured water generator comprising:
a motor;
a rotation generator coupled to the motor; and
a vortex generator coupled to the rotation generator by a shaft, the vortex generator being configured to rotate at a first speed based on a rotational speed of the rotation generator, wherein the vortex generator comprises a spiral tube, and the vortex generator is configured to generate the structured water in accordance with the first speed;
a mineral reactor coupled to the structured water generator and the water supply source, the mineral reactor being configured to generate MgO and $H_2$ and to transfer the MgO and $H_2$ to the structured water generator, wherein the mineral reactor includes:
a container configured to store magnesium; and
a rotator coupled to the container,
wherein the rotator is configured to mix the magnesium with the filtered water received from the water filtration system to generate the MgO and $H_2$;
a gas supply coupled to the structured water generator, the gas supply being configured to provide one or more gases to the structured water generator, wherein the one or more gases comprise at least one of oxygen, hydrogen, carbon dioxide, or nitrogen;
a magnetizer coupled to the structured water generator, the magnetizer being configured to generate a magnetic field to align the structured water in a direction; and
a dispenser coupled to the magnetizer, the dispenser being configured to dispense the structured water.

20. A method of producing structured water, the method comprising the steps of:
connecting a water supply source to the coupling of the water dispensing device of claim 19;
passing the water through the water filtration system to provide filtered water to the structured water generator;
providing, by the mineral reactor, hydrogen and MgO to the structured water generator;
providing, by a gas supply, one or more gases to the structured water generator;
activating the structured water generator so that the rotation generator coupled to the motor rotates the vortex generator to generate a vortex at a speed to induce cavitation and implosion for producing the structured water; and
outputting the structured water to the magnetizer that generates a magnetic field to align the structured water in a direction.

* * * * *